Amp₁, Amp₂: Amplifiers
Md₄: Modulators

Sept. 13, 1966  J. CSECH  3,272,975
AUTOMATIC MACHINE-TOOL CONTROL SYSTEM FOR
TRUING MECHANICAL PARTS
Filed Oct. 23, 1962

INVENTOR
JOSEPH CSECH
BY: Paul M. Craig, Jr.
ATTORNEY

United States Patent Office 3,272,975
Patented Sept. 13, 1966

3,272,975
AUTOMATIC MACHINE-TOOL CONTROL SYSTEM
FOR TRUING MECHANICAL PARTS
Joseph Csech, Paris, France, assignor to Compagnie
Generale d'Automatisme, Paris, France
Filed Oct. 23, 1962, Ser. No. 232,354
Claims priority, application France, Oct. 27, 1961,
877,231
22 Claims. (Cl. 235—151.11)

The present invention relates to devices for the automatic electrical control of machines for rectifying or truing mechanical parts and is applicable to the cases where machining data furnished to the said machines are derived from measurement data obtained from an apparatus for testing the untrued part and included in a measuring unit, which data are expressed at the output of this unit by several analogue electrical variables, that is to say, the magnitudes of which are capable of varying continuously, these variables consisting of direct-current voltages or preferably fixed-frequency alternating-current voltages.

It is known that in the devices of the kind hereinbefore specified, the physical magnitudes furnished by the test apparatus and represented by voltages must, for their subsequent utilisation, be evaluated in an analogue computer, where they are subjected to various mathematical operations both linear and non-linear, the object of which is to convert them into magnitudes directly proportional to final machining data which can be used by a machine tool. In the very general cases, the final machining data concern, which appear in analogue form, must be stored for a certain interval of time before being transferred to the machine which has to make use of them. As it is generally not very practical—if not impossible—to store electrical data in analogue form, the latter are coded, that is to say they are expressed in digital form and stored in this latter form (generally in binary notation) until their final utilization.

It is also known that the aforesaid operations may be divided into two categories: the first are necessary, due to the fact that the data which translate the defects of the part to be trued are measured at points of, or in portions of, said part where measurement is easy, but where on the contrary subsequent machining is not possible. In a first series of operations, therefore, the measurement data are converted into other data, referred to hereinafter as "primary correction data" constituting a collection of parameters equivalent to the measure data, but transposed to preselected portions of the part so that machining will be possible. It may then happen that the defects of the part are such that the "correction" data are partly "positive," that is to say the truing operations which they require correspond to a removal of material, and partly "negative," that is to say, corresponding to an application of material. Since such application of material is not possible, in principle, by means of a machine tool, it is necessary by a second series of operations to replace the collection of primary correction data, some of which cannot be used, by a collection of other data, hereinafter referred to as "secondary correction data," all having the the suitable algebraic sign, this replacement implying of course the partial or total transfer of the correction data concerned and of the corresponding machining to portions of the part where a positive correction may replace the negative correction recognised to be impossible in the initially selected portions; in other words, there must be a larger number of "correction zones" in the part than that of the bits of information represented by the measurement data, even though some of these zones may sometimes not be used.

The conversion of the measurement data into primary correction data is a linear conversion, due to the fact that the defects of the part are substantially assumed to be small; the conversion coefficients are in part constant and in part dependent solely on the geometrical shape of the part. On the other hand, the conversion of the primary data into secondary correction data will be termed "linear with controlled coefficients," in the sense that it uses linear operations, but carried out with coefficients which may assume alternatively one or the other of several discrete values, the choice of which is determined substantially by the algebraic signs of one or more of the primary correction data. The computer effecting this latter conversion will be referred to hereinafter as a hybrid computer, it being understood by this that it is an analogue computer, certain elements of which are under the dependence of a "logical" circuit acting in a discontinuous manner as a function of certain characteristics of the input variables. Since the latter, in the applications herein considered, are alternating-current voltages, these characteristics will be their phases, which, assuming either of two opposite values, will perform the part hereinbefore attributed to the algebraic signs.

When a complete set of secondary correction data has been obtained by the aforesaid successive linear transformations, it is still generally necessary to subject each of these secondary data to an almost always non-linear transformation to translate it into a final machining datum, representing for example the penetration length of the tool effecting the desired truing. The generally non-linear character of the transformation concerned results from the geometrical shape of the part to be machined. If for example this part has a shape of revolution, the tool at the moment it enters into contact with the part will commence to remove only very little material for a given length of advance, then all other things being equal, it will remove more and more, the deeper it penetrates. For simplicity of language the directions of progress of the tools into the part, which directions are fixed relative to reference planes connected with said part, will be hereinafter referred to as "machining axes."

The above-mentioned non-linear transformation, terminating at the final machining data, must obviously be effected before these data have been brought into digital form for their storage and ultimate use.

Some of the above-mentioned principles—linear transformations and digital coding—are already known and an example of their application to the rectification of the rotation unbalance (untrue running) of a rotating part is more particularly given in the French Patent 1,241,768. This latter patent also indicates electromechanical means for obtaining, in the particular case considered, the measurement data in the form of two sinusoidal alternating-current voltages, the magnitudes and phases of which furnish four distinct bits of information. Analogue computer mechanisms, utilising adjustable voltage dividers using resistances (potentiometers) and adapted to carry out the desired linear operations are also mentioned therein, as well as electromechanical means for effecting other linear transformations leading to the final machining data. Such means furnishing the measurement data, and those effecting the linear transformations which have just been mentioned, do not form part of the present invention. On the contrary, the analogue computing means used according to the invention for effecting the abovementioned linear transformations, in particular the second of the latter, differ profoundly from the known art. Their advantage over the latter resides in that, although they do not have the flexibility of systems utilizing potentiometers in the sense that, contrary to these latter systems, they are not liable to an easy change of the values of the coefficients involved in the transformations; on the contrary when these coefficients are fixed, as is the case for a machine intended to machine a large number of parts of the same type, the means of the invention permit a higher degree of reliability and precision. These means essentially utilize combinations of transformers for effecting the desired linear transformations.

According to the invention, improvements are provided in automatic electric control systems of machine tools for truing mechanical parts by removal of material from predetermined portions of these parts, in which measurement data representing in analogue form the initial defects of the parts are first of all obtained by mechanical tests made in a test apparatus forming part of a measuring unit, and translating these defects into electrical magnitudes, preferably into one or more alternating-current voltages of the same frequency and of variable magnitude and phase relative to a reference auxiliary alternating-current voltage of the same said frequency. In this measuring unit, the voltages thus obtained are then processed in a first analogue computer which transforms them linearly into $m$ primary correction data relative to the portions of the parts capable of being machined; these latter data, carrying a positive or negative algebraic sign according to whether they correspond to a removal or to an application of material, are translated in this first computer into a first series of fixed-frequency alternating-current voltages of magnitudes proportional to those of the said primary data and having either of two opposite phases according to the algebraic sign of each of said primary data. A second analogue computer then applies to the voltages of this first series a new transformation having "controlled coefficients," that is to say, the various coefficients thereof may assume one or the other of several discrete values under the dependence of a logical circuit controled from the whole of the signs of the aforesaid primary data; this second computer furnishes at its output a number $n$ greater than $m$ of secondary correction data represented by a second series of fixed-frequency alternating-current voltages of magnitudes dependent, by means of the second transformation, on the magnitudes of the primary data. The $n$ secondary correction data thus obtained in analogue form are then subjected individually to a non-linear transformation, translating them into $n$ analogue machining data proportional to penetration lengths of tools. To permit their storage for a certain length of time before their effective use in a machine tool, the analogue machining data are finally brought into digital form by coders employing preferably the binary notation and are presented in this form at the output of the measuring unit.

The systems of the invention have separately or in combination one or more of the following features:

(1) The second analogue computer comprises a weighted summation network with transformers, these transformers having a plurality of secondary windings connected in series and in addition or in opposition or rendered inoperative, by switching members, the position whereof is controlled by the aforesaid logical circuit, while the primary windings of these transformers are subjected to the alternating-current voltages of the said first series.

(2) The switching members mentioned in (1) are electromechanical relays fed or not by currents obtained from the output of $2^p$ amplifiers, preferably transistorised, each of which has its input subjected to a direct-current control voltage, obtained from the output of a corresponding resistance network having $p$ inputs, each subjected to a direct-current voltage having either of two possible values, the choice of which is made under the dependence of the algebraic sign of each $p$ of the $m$ primary data, the whole of the $2^p$ resistance networks realizing all the possible $2^p$ combinations of $p$ voltages each having two possible values.

(3) The first aforesaid analogue computer also utilizes a weighted summation network comprising transformers, whereof the primary windings are fed by alternating-current voltages representing the measurement data and each having a plurality of secondary windings, whereof the transformations ratios and directions of connection are arranged in a fixed manner.

(4) In the embodiment considered in (3) part of the linear transformation made by the first computer is effected by rotating electromagnetic devices called "resolvers," the angular position of which is subject to the phase relations existing between the voltages representing the measurement data and the aforesaid auxiliary reference voltage.

(5) In the embodiment considered in (4), the spindles of the resolvers carry discs provided with semi-circular slits, intercepting or not intercepting, according to the angular position of the resolvers, the beams of light sources illuminating photoelectric cells generating direct currents for controlling the logical circuit referred to in (2), preferably by means of the resistance networks mentioned in (3).

(6) The machining data brought into digital form are divided into groups utilized successively at a later time by a plurality of units separated from each other by storage units; the part to be machined is successively transferred from the test and measuring unit to a first storage unit followed by a first machining unit and so forth up to a last machining unit; the digital data relative to a given part are correspondingly first stored in a first memory device situated at the output of the measuring unit, then transferred to another memory device included in the first storage unit, and then to each of the elements of a chain of successive memory devices, each of which corresponds to a machining or storage unit, up to the last machining unit and in the order of intervention of the various units. The data-recording capacity of each of the memory devices corresponds to the number of machining data groups still to be used after each machining unit.

(7) In the case considered in (6), the machining data furnished by the measuring unit are admitted to the first memory device only under the action of an electrical signal termed "general machining commencement signal" generated at a later time by a signal termed "transfer" signal furnished when all the machining units have simultaneously terminated the mechanical operations, alloted to each of them, on the part with which the latter is engaged at the time.

(8) In the case considered in (7), the various memory devices form part of a shift register, in which the advance of the recorded data from one stage to the next takes place under the action of the electric transfer signal mentioned in (7).

(9) Each of the machining units referred to in (6) comprises local memory devices formed by the terminal stages of the register referred to in (7) and in number equal to that of the machining data which have to be used in this unit, each of said latter devices corresponding to one of these latter data; the transfer of a group of coded signals, representing the value of a machining datum, to the corresponding local memory device from that memory device of the chain referred to in (6) which immediately precedes this local device in the said chain, takes place under the action of the transfer signal referred to in (7).

(10) Each of the machining units referred to in (6) comprises electric pulse counters in number equal to that of the machining date which are to be utilised in said unit; electrical pulses are regularly emitted by a mechanism connected to the infeed of each tool. When the tool comes into contact with the part to be machined, an auxiliary mechanism sets the corresponding counter in operation, while an auxiliary electrical circuit compares the composition of a group of coded binary signals resulting from the counting, and of the group recorded in the local memory device referred to in (9), corresponding to the same machining datum; when these compositions are found to be identical, the auxiliary comparison circuit generates an electrical signal termed "end of partial machining signal" stopping the individual motor driving the tool; the simultaneous presence of all such end of partial machining signals produces the transfer signal referred to in (7).

(11) The whole or the motors driving the tools are started under the action of the electrical signal called "commencement of general machining signal" produced at a later time by the transfer signal referred to in (7), which first of all puts into operation the electromechanical members transferring mechanically each part to be machined from a storage or machining unit to the next unit, the said commencement of general machining signal being emitted when the mechanical transfer is completed.

(12) In the embodiment considered in (10), the local memory device and the corresponding pulse counter are preferably combined in one and the same apparatus; this apparatus, under the control of the immediately preceding memory device in the chain referred to in (6), registers a group of coded signals representing the difference between the maximum numerical value at which it can record and that recorded by the said corresponding device of said chain; the indication recorded by the apparatus is then increased by a quantity at each instant equal to the number of counted pulses, and the signal for stopping the individual motor of a tool is generated when the apparatus has reached its maximum counting capacity.

Other features and advantages of the invention, more particularly in regard to the means which it uses for the digital coding of the data, their storage and transfer to the different stages of their final use will appear better in the detailed description given hereinafter. For clarity of the explanation, this description is divided into several parts; in the first part, an explanation is given of the general operation of a system utilizing the invention. The second part explains in fuller detail the constitution of the aforesaid analogue computers and digital coder. The third part concerns the description of means for putting into practice the coded machining data, some of which means are foreign to the invention but the knowledge thereof emphasizes more prominently the usefulness of the invention.

Although the invention is not limited to any particular type of mechanical part to be machined, nor to a given class of such parts, the detailed description given hereinafter will be made with reference, by way of example, to the case of a rotating part, the rotational out-of-balance of which it is desired to correct. It must be well understood, however, that such an example is by no means restrictive and that arrangements similar to those described herein would be perfectly well applicable to the case of any mechanical part whatsoever, provided that the defects which it has before truing can be measured in an electromechanical test apparatus, in which this part would be subjected to an impressed periodical movement, and in which the vibrations and other parasitic movements which it would assume in consequence of its defects could be translated by electromechanical transducers of any known type into periodical electrical magnitudes of measurable amplitudes and having phases defined relative to a reference phase, itself defined by the motive member imparting to the part under test the aforesaid impressed movement.

The invention will be better understood from the following detailed description made with reference to the accompanying drawings, in which.

*General operation of an installation utilizing the invention*

Figure 1:
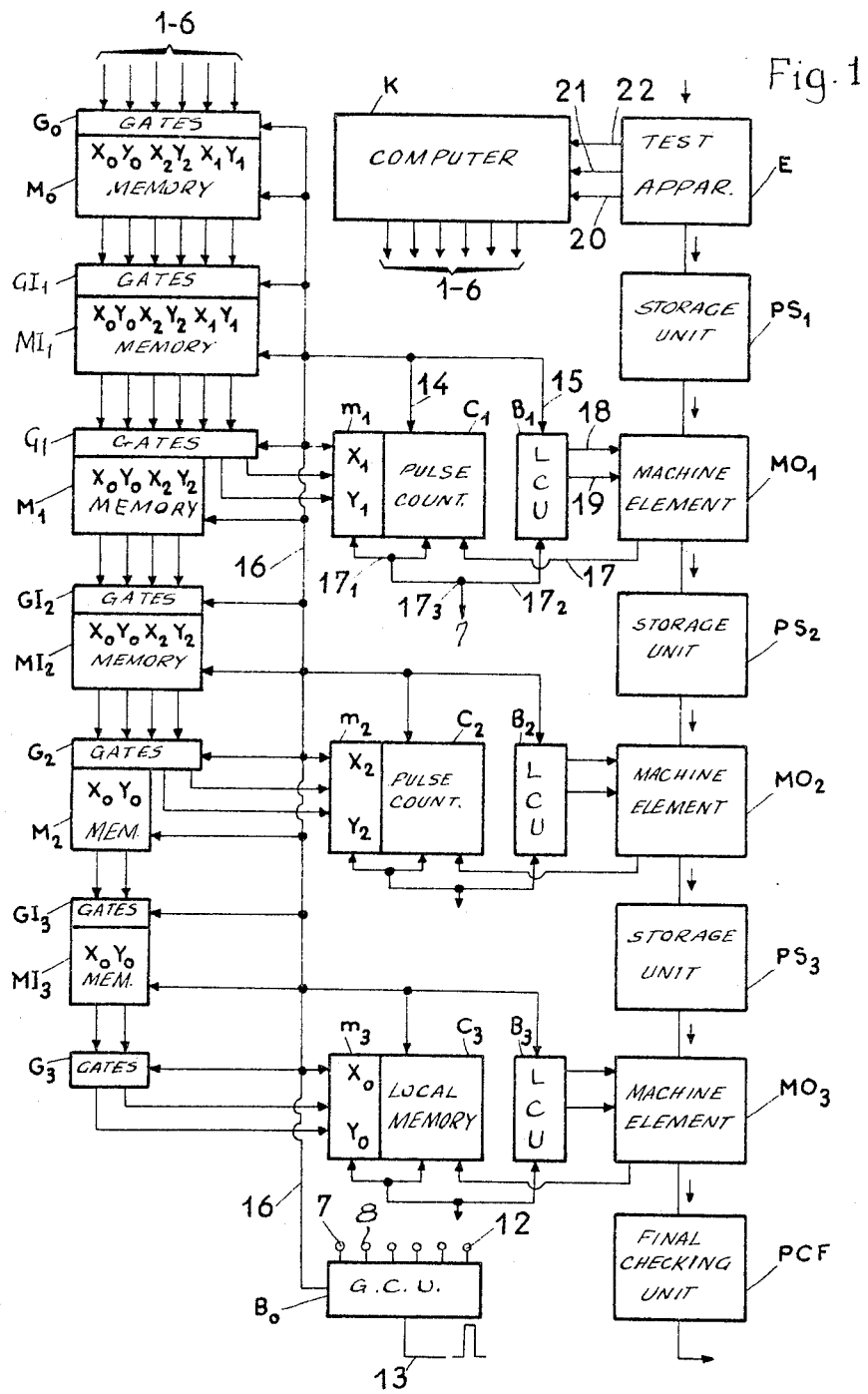
FIGURE 1 is a simplified comprehensive diagram of an automatic transfer machine for machining mechanical parts, utilizing the invention.

Referring first of all to FIGURE 1, the latter represents the whole of an automatic transfer machine for machining mechanical parts.

In the installation of FIGURE 1, the mechanical part to be machined first of all, at the upper right-hand side of the figure, enters a test apparatus E, which with the computer K forms the measuring unit. By mechanical means not shown in the drawing and which do not form part of the invention, the part then passes successively through a first storage unit $PS_1$, through a first machine tool $MO_1$, through a second storage unit $PS_2$, through a second machine tool $MO_2$, through a third storage unit $PS_3$, through a third and last machine tool $MO_3$ and thence through a final checking unit PCF. The part to be machined remains a certain length of time in each of these aforesaid units, while other parts of the same type each remain in one of the other units. Such an arrangement is necessary because machining cannot generally be done in a single operation, due to the geometrical shape of the part, for example. At a given instant, therefore, there are eight parts in the installation, one in the apparatus E and seven others in each of the seven successive units $PS_1$ to PCF. The mechanical means for transferring a given part from one of the units to the next operate at variable time intervals under the action of the previously mentioned transfer signal transmitted when all the machines $MO_1$ to $MO_3$ have completed their work on the part occupying each one of them for the time being. The time intervals referred to are variable because, depending on the more or less considerable defects of a given part, corresponding truing is more or less considerable and therefore requires a machining time of greater or lesser length.

The means employed for producing and utilizing the "transfer signal" will be explained hereinafter.

In the example of FIGURE 1, it is assumed that machining is carried out in three stages, corresponding to the machines $MO_1$ to $MO_3$, and that each of the latter comprise two machining heads (tool-supports) working simultaneously. The measuring unit (E, K) must therefore furnish to all the machines, at a suitable time, six digital machining data (some of which may be zero); these data must be stored and transferred to the corresponding machining unit at the suitable moment.

In the apparatus E, the part to be trued is tested, for example by vibration. The result of the test is shown by the appearance of alternating-current voltages of frequency equal to that of the periodical movement imposed on the part by E, which voltages appear at the connections 21, 22, at the same time that a reference voltage, obtained directly from the mechanical member imposing the movement, appears at the connection 20. It is here assumed that these three voltages are together sufficient to characterise the defects of the part, which is the case, as will be explained in detail hereinafter, of a part whose rotational unbalance is to be corrected.

The voltages appearing at 20, 21, 22 are processed by a procedure, explained in deail hereinafter, in the complex computer K, formed of a plurality of partial computers, and appear as six machining data $X_0$, $Y_0$, $X_1$, $Y_1$, $X_2$, $Y_2$ in the form of six groups of signals coded digitally according to the binary code (that is to say representing numbers by digits, using only the values 0 and 1 and appearing in the form of voltages of two corresponding values) at the connections 1 to 6, at the output of K. It should be well understood that by "connections 1 to 6" is meant in reality groups of connections, each of which comprises a number of pairs of conductors equal to the number of digits of the code adopted. If, for example, a code having seven binary elements is adopted, permitting each numerical machining datum to be expressed by a whole number between 0 and 127, each "connection" will comprise seven pairs of conductors or at least eight conductors if all the pairs have a conductor in common. The number of digits adopted depends on the desired precision.

The groups of coded signals, which remain present at the connections 1 to 6 of K during the whole of the time which the testing of the part in E lasts, said test commencing with the abovementioned general machining commencement signal, and continuing as long as a fresh general transfer signal, the origin of which has been explained in the foregoing, has not come into operation, are transmitted by the connections 1 to 6 to the input terminals of corresponding reference numerals of the apparatus $G_0$. In the example selected, there are therefore 42 pairs of conductors for conveying the 42 (that is to say 7 x 6) binary digits corresponding to the 42 pairs of groups of terminals 1 to 6 of the apparatus $G_0$; this latter is itself formed of a group of "controlled admission" circuits (also called "gates," "AND" circuits, intersectors, etc., in the electrical computer art). It is understood by this that the circuits transmit the signals applied to their input to an apparatus connected to their output only after receipt of an auxiliary signal of external orgin. In the present case, this auxiliary signal is no other than the abovementioned general machining commencement signal, formed for example by an electrical pulse of given polarity applied at terminal 13 and carried by the connection 16 after being transmitted by the "general control unit" $B_0$, the operation of which is in turn under the dependence of the end of the various machining operations, in a manner which will be explained hereinafter. The output of apparatus $G_0$ feeds the memory device $M_0$ which registers and stores the coded data furnished by K.

At the instant when the transfer signal formed for example of a pulse of polarity opposite to the preceding one, is transmitted from $B_0$ to $G_0$ by the connection 16, the coded data $X_0$, $Y_0$, $X_1$, $Y_1$, $X_2$, $Y_2$ cease to be transmitted by $G_0$ to the memory device $M_0$. The values of these data, stored in $M_0$ on the occasion of its previous operation, are at the same time transmitted, by another gate device $GI_1$ to an intermediate memory device $MI_1$, always under the action of the same transfer signal from the connection 16. The device $M_0$ is then ready again to receive data at a later moment.

Likewise, the data previously stored in $MI_1$ are transmitted in part by the gate device $G_1$ to the memory device $M_1$ for subsequent use at a suitable time, and in part (for example $X_1$ and $Y_1$) to a local memory device $m_1$ directly associated with the first machining unit comprising the machine tool $MO_1$ and its associated electrical appliances (pulse counter $C_1$ and local control unit $B_1$), the function of which will be explained later.

The data previously stored in $M_1$ are likewise transmitted, still under the action of the same transfer signal, to the intermediate memory $MI_2$, through a device $GI_2$, similar to $GI_1$ and $G_0$, and so forth, through $G_2$, $M_2$, $GI_3$, $MI_3$ and $G_3$, as far as the last local memory device $m_3$ associated with the machine $MO_3$, the output of $G_2$ having in the meantime transferred the data $X_2$, $Y_2$ from $MI_2$ to the memory device $m_2$ associated with $MO_2$, and the number of data recorded in each of the devices $MI_1$, $M_1$, $MI_2$, $M_2$, $MI_3$ diminishing as groups of data are detached towards $m_1$, $m_2$, $m_3$.

Of course, the number of "channels" of each of the gates $G_0$, $GI_1$, etc., is adapted to the magnitude of the groups of signals which it has to transmit and diminishes correlatively from $G_1$ to $G_3$.

The assemblage of the various memory devices and gate devices $MI_1$, $M_1$, $m_1$, etc., $G_0$, $GI_1$, etc., forms what is called in the electrical computer art a "shift register" (also called sliding register, transfer register, etc.). It is known in this art that it is possible to construct such devices comprising a sequence of stages constituted by cascade-connected bistable multivibrators or flip-flops, in such a manner that a control signal applied simultaneously to the entire system of the installation causes the information (binary digit), materialized by the state of each stage, to advance from this stage to the next. Of course, in practice, it may be necessary to stagger in time the operation of the successive stages by means of delay elements or circuits having appropriate time constants, which may be included for example in the devices $G_0$, $GI_1$, etc., of FIGURE 1 to prevent a bit of information from being introduced into a given stage before the bit of information, previously contained therein, has been transferred to the next stage, particularly when the latter is the final stage.

Various forms of shift registers having the properties explained in the foregoing are well known. These devices may employ electronic tubes, transistors, magnetic cores having a rectangular hysteresis cycle or several of these means, possibly combined with electromechanical relays. Their construction does not form part of the present invention and will not be described in further detail herein.

The function of the final checking unit PCF of FIGURE 1 is to make measurements on the part leaving $MO_3$, similar to those made in E and to furnish a corresponding indication of acceptance or rejection. The means employed for this purpose are outside the scope of the invention.

Having thus described in its essential details the sequence of operations carried out in the installation of FIGURE 1, the processes and means employed therein for producing the previously mentioned "transfer signal" and general machining commencement signal, as well as the various signals preliminary to the partial end of machining respectively transmitted when each of the tool supports of $MO_1$, $MO_2$ and $MO_3$ has terminated its work on the part which occupies it for the time being, will be described in a latter part of this account. The production of these preliminary signals determines furthermore that of the general transfer signal as well as the essential operations, such as the starting and stopping the tool-support driving motors. Before describing these processes and means, it is necessary first of all to examine how the machining data $X_0$, $Y_0$, $X_1$, $Y_1$, $X_2$, $Y_2$ are obtained from the alternating-current voltages developed in 20, 21, 22 by E (FIGURE 1).

*Obtaining and coding of the machining data*

The processing of these data from the voltages referred to comprises two successive stages of analogue computation, followed by a digital coding stage.

Figure 2:
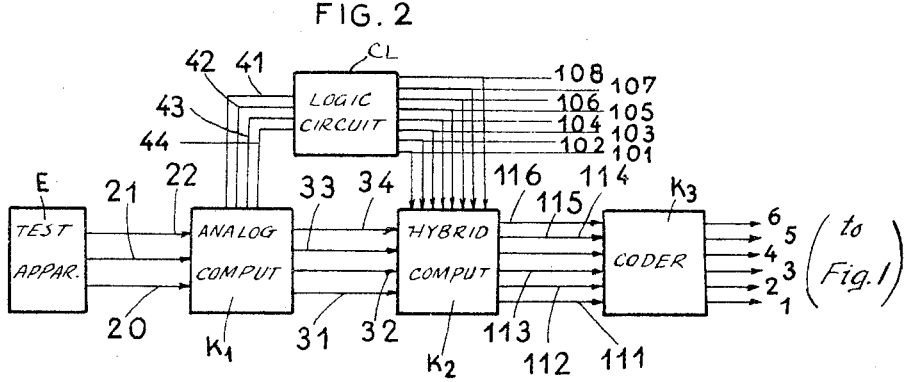
FIGURE 2 shows in a single-wire diagram a simplified diagram of a measuring unit forming part of the system of FIGURE 1, comprising a test apparatus for the parts to be machined and furnishing at its output digitally coded machining data.

Referring now to FIGURE 2, the latter represents diagrammatically but in greater detail the composition of the measuring unit formed of E and K of FIGURE 1.

The assemblage of the device of FIGURE 2 comprises the test apparatus E already mentioned in connection with FIGURE 1, while the element K of this latter figure is represented by the assemblage of the elements $K_1$, CL, $K_2$ and $K_3$ of FIGURE 2.

In FIGURE 2, $K_1$ is the first linear analogue computer already mentioned in the foregoing and furnishing the primary correction data from the measurement data delivered by E, CL is the logical circuit modifying under the action of certain characteristics of these primary data the values of certain of the numerical coefficients employed in the second hybrid computer $K_2$ which furnishes at its output the secondary correction data, and $K_3$ is the coded transforming these latter data into machining data coded digitally into groups of binary signals and appearing a the output connections 1 to 6 of $K_3$ (which in reality are groups of connections, as already mentioned in the foregoing in connection with FIGURE 1).

The nature and mode of operation of the apparatus E will now be explained by taking as example a rotating mechanical part having no rotation symmetry, such as the crank-shaft of an internal combustion engine. It should here be understood that the apparatus E (just as any other apparatus for the electromechanical testing of parts to be trued) does not form part of the invention, and that the brief description given hereinafter has no other purpose but to make understood, by means of a typical example, the reasons for the method of processing the alternating-current voltages appearing at the output terminals 20, 21, 22 (FIGURES 1 and 2) of said apparatus, and how the machining data may be derived from these voltages.

Figure 3:
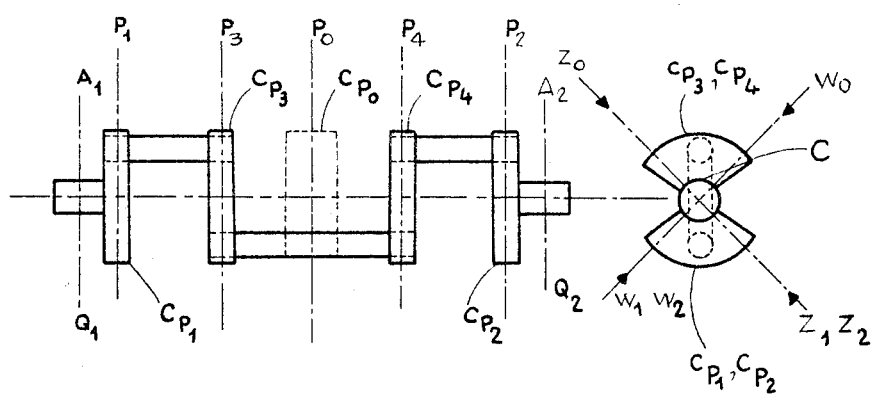
FIGURES 3 and 4 are two views of a part to be machined with certain associated geometrical elements.

The part to be tested, represented in a very simplified manner in FIGURE 3, in the left-hand part of this figure in projection on a plane passing through its mechanical axis, and in the right-hand part of this figure a projection on a plane perpendicular to said axis, is approximately balanced relative to said mechanical axis, which is that around which the part is to rotate in its normal use. An approximate balance in rotation is realised, as shown in the right-hand part of FIGURE 3, by the symmetrical arrangement of the counterpoises $Cp_1$, $Cp_2$, $Cp_3$, $Cp_4$ of substantially equal masses around the axis A and relative to the center of this axis. It is proposed to correct the residual rotational out-of-balance (often called "unbalance") by the removal of material from the four counterpoises (or from some of them only) in the vicinity of planes $P_1$, $P_2$, $P_3$, $P_4$ perpendicular to A and in the regions where the mutually perpendicular axes ($W_1$, $W_2$) ($Z_1$, $Z_2$) meet the external surfaces of $Cp_1$ and $Cp_2$ and in those where axes parallel to ($W_0$, $Z_0$), that is to say, respectively parallel to ($W_1$, $W_2$) and ($Z_1$, $Z_2$), but oriented in the opposite direction, meet $Cp_3$ and $Cp_4$. In the course of the description, it will furthermore be assumed, for simplicity of argument, that the counterpoises $Cp_3$ and $Cp_4$ are replaced by a single fictitious central counterpoise $Cp_0$, of a mass double that of the others. It is evident that if the distances between $P_1$ and $P_3$, on the one hand, and between $P_2$ and $P_4$ on the other hand are equal. The quantities of material to be removed at $P_3$ and $P_4$ are half that which would have to be removed at $P_0$ on the fictitious central counterpoise $Cp_0$.

It is also evident that it will always be possible to balance the part by removing material in the vicinity of the points where the "machining axes" $W_0$, $Z_0$, $W_1$, $Z_1$, $W_2$, $Z_2$ (or axes parallel to the latter and similarly oriented) meet $Cp_1$, $Cp_2$, $Cp_3$ and $Cp_4$.

Figure 4:
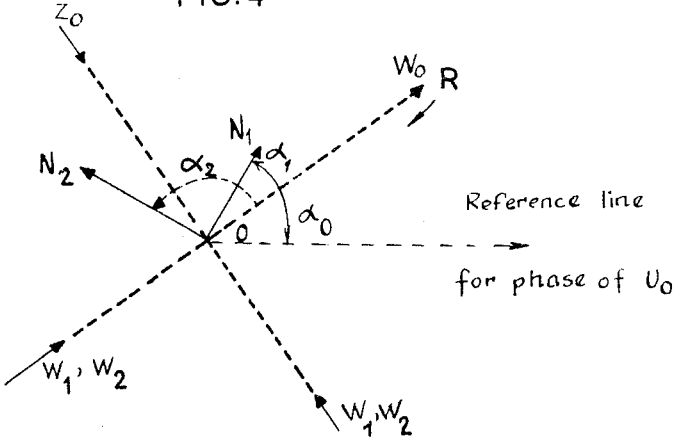

According to principles known in mechanics, the rotational out-of-balance of the part of FIGURE 3 may be represented in the planes $Q_1$ and $Q_2$ perpendicularly at the shaft ends $A_1$ and $A_2$ by two vectors $\overline{ON}_1$ and $\overline{ON}_2$, represented in FIGURE 4 in projection on a plane perpendicular to the axis A, which meets this latter plane at the point O. The physical magnitude represented by each of these vectors has the dimensions of a product of a mass by a length with, in each of the planes $Q_1$ and $Q_2$ a magnitude $ON_1$ (or $ON_2$) and an orientation defining an angle $\alpha_1$ (or $\alpha_2$) with respect to a reference plane R passing through A (FIGURE 4). The choice of R is arbitrary, but it is convenient to take for R a plane making an angle of 45 degrees with that which would symmetrically cut the four counterpoises, and for the directions ($W_1$, $W_2$, $W_0$) and ($Z_1$, $Z_2$, $Z_0$) directions perpendicular to A and making with R angles of 0 and 90 degrees, respectively.

Referring again to FIGURE 2, the mechanism whereby the test apparatus E measures the magnitudes and orientations of the vectors $\overline{ON}_1$ and $\overline{ON}_2$ and translates them at its output terminals 20, 21, 22 into alternating-current voltages $u_1$, $u_2$, $u_0$ will now be examined.

The ends $A_1$ and $A_2$ of the shaft of axis A (FIGURE 3) of the part to be tested are mounted in resilient bearings adapted to move in a horizontal plane. The part under test is rotated at a constant angular velocity, higher than its critical velocity, of $f_0$ revolutions per second (for example $f_0$ may be made equal to 15 cycles per second for an internal combustion engine crankshaft of current type). The bearings which would remain stationary if the part was perfectly balanced, make by virtue of the existing slight defect of balance sinusoidal periodical alternating movements, the amplitudes of which are proportional to the magnitudes $\overline{ON}_1$ and $\overline{ON}_2$ (O being the point at which the axis A meets the plane of FIGURE 4), and the phases of which are represented in FIGURE 4 by the angles $\alpha_1$ and $\alpha_2$ of $\overline{ON}_1$ and $\overline{ON}_2$ with the reference direction R, by conventionally assuming a phase-origin corresponding to an instant at which the direction R connected to the rotating part is horizontal. A polyphase electrical alternator keyed by the keying $c$ to the end of shaft A (FIGURE 3) furnishes a reference polyphase alternating-current voltage $u_0$ of frequency $f_0$, whereof the phase of any one of the component voltages is fixed relative to the said phase-origin.

The sinusoidal movements of $A_1$ and $A_2$ (or rather of the bearings carrying them) act on electromagnetic vibration pickups. The latter comprise substantially magnetic circuits located in the immediate vicinity of the bearings and arranged relative to the latter in such a manner that their magnetic reluctance varies in accordance with the movements of these said bearings. Around the magnetic circuits are placed windings, through which passes an alternating curent of constant intensity and relatively high frequency (for example 1000 c./s.). There then appear at the terminals of the windings voltages having 1000 c./s. amplitude modulated at the frequency $f_0$, with modulation rates proportional to the magnitudes $ON_1$ and $ON_2$ and modulation envelope phases equal to the angles $\alpha_1$ and $\alpha_2$, except for a constant angle $\alpha_0$, relative to any phase reference voltage derived from the aforesaid alternator. The phase of the latter said voltage is indicated in FIGURE 4 by the reference line which makes the angle $\alpha_0$ (here a negative angle) with direction R.

After suitable demodulation and filtering (it is advisable to use a pass-band filter having a fairly narrow band centered on $f_0$), there are thus obtained (if necessary after amplification), from the windings of the pickups and at the output terminals 21, 22 of E (FIGURE 2) alternating-current voltages of frequency $f_0$ and amplitudes $U_1$ and $U_2$ proportional to the magnitudes of the vectors $\overline{ON}_1$ and $\overline{ON}_2$, and of phases $(\alpha_1-\alpha_0)$ and $(\alpha_2-\alpha_0)$ relative to that one of the components of the polyphase voltage $u_0$ appearing at 20 (FIGURE 2) which has been selected as a reference phase, as shown in FIGURE 4.

The knowledge of $u_1$ and $u_2$ in magnitude and phase therefore suffices to determine theoretically the vectors $\overline{ON}_1$ and $\overline{ON}_2$, represented in magnitude by the amplitudes $U_1$ and $U_2$ of $u_1$ and $u_2$, and in direction by their angles $\alpha_1$ and $\alpha_2$ with respect to a reference phase derived from $u_0$. This knowledge alone, however, is not sufficient for defining the machining data, because it is not possible to effect machining operations in the vicinity of the planes $Q_1$ and $Q_2$ situated near the shaft ends. It is therefore necessary in the first place to transform the indications obtained into "primary correction data" applicable to machining axes situated in the planes $P_1$, $P_2$; that is the function of the computer $K_1$ (FIGURE 2).

According to the principles known in mechanics, the transformation to be applied to the vectors $\overline{ON}_1$ and $\overline{ON_2}$ for obtaining equivalent vectors in the planes $P_1$ and $P_2$ is a linear transformation with constant coefficients, whereof the values of the coefficients depend solely on the distances between $P_1$, $P_2$, $Q_1$ and $Q_2$, and may therefore be determined once and for all for a given type of part. It is found in fact that the law of composition applicable to the magnitudes and directions of the vectors in the said transformation is identical with that of the voltages representing them, by assimilating the magnitudes and angles of orientation of the former with the amplitudes and phases of the latter. It will therefore be possible to represent the equivalent "out-of-balance vectors" referred to the planes $P_1$ and $P_2$ by alternating-current voltages $v_1$ and $v_2$ derived from $u_1$ and $u_2$ by the relations:

$$v_1 = a_1 u_1 + b_1 u_2 \quad (1)$$
$$v_2 = a_2 u_2 + b_2 u_2$$

Practically, in the case of FIGURE 3, the symmetry of the part with respect to the center of its length means that $a_1$ and $b_2$ are equal, as are also $b_1$ and $a_2$. Hereinafter, the value common to $a_1$ and $b_2$ will be represented by $a$, and the value common to $b_1$ and $a_2$ by $b$; the above formulae then become $$v_1 = au_1 + bu_2 \quad (2)$$
$$v_2 = bu_1 + au_2$$

The voltages $v_1$ and $v_2$ representing the out-of-balance vectors referred to the planes $P_1$ and $P_2$ being determined by the above Formula 2, employed by an analogue computer, a fresh transformation is necessary for deriving therefrom the "primary correction data," which will represent the projections of these vectors on the directions $(W_1, W_2)$ and $Z_1, Z_2$) (FIGURE 4).

Denoting by $\theta_1$ and $\theta_2$ the phase angles, still defined as for $u_1$ and $u_2$, of the voltages $v_1$ and $v_2$, and by $V_1$ and $V_2$ their amplitudes, it is therefore necessary for obtaining the primary correction data $x_1$, $y_1$, $x_2$, $y_2$, to compute $$x_1 = V_1 \cos \theta_1 \quad (3)$$
$$y_1 = V_1 \sin \theta_1$$
$$x_2 = V_2 \cos \theta_2$$
$$y_2 = V_2 \sin \theta_2$$

The set of mathematical operations represented by the Equations 2 and 3 may therefore be performed by analogue computers in various ways. For example, the Operation 2 may be carried out by a weighted summation network of any known type (potentiometer or other type) and the Operation 3 by balanced modulators fed at one of their inputs with $v_1$ or $v_2$ and at their other input with reference alternating-current voltages of the same frequency as $v_1$ and $v_2$ but phase-displaced by 90 degrees. The algebraic quantities $(x_1, y_1, x_2, y_2)$ then appear at the output of the modulators in the form of direct-current voltages. It is also possible to transpose the order of the operations by performing first of all a transformation similar to (3) on $u_1$ and $u_2$ (by employing the angles $\alpha_1$ and $\alpha_2$ instead of $\theta_1$ and $\theta_2$), then by carrying out the Operation 2 on the result of this transformation.

The solution here adopted is preferable to the foregoing in regard both to the precision and reliability of the means employed and the simplicity of the devices employed, which utilize currents of industrial frequency (50 c./s. or 60 c./s. for instance, or any standard power line frequency; for convenience, the value 50 c./s. will be retained hereinafter, but this only by way of example) and which have in addition the advantage that the devices performing the transformations (3) are at the same time advantageously used for providing, in addition to this transformation, control signals necessary for the operation of the logical circuit (CL) which conditions the hybrid computer $K_2$ of FIGURE 2.

The structure of the analogue computer $K_1$ of FIGURE 2, which makes use the voltages $u_1$, $u_2$, $u_0$ furnished by E for deriving therefrom the quantities $(x_1, y_1, x_2, y_2)$ defined by the above Equations 3, and at the same time for delivering to the logical circuit (CL) of FIGURE 2 the above-mentioned control signals, will now be described in detail with reference to FIGURES 2 and 5.

Figure 5:
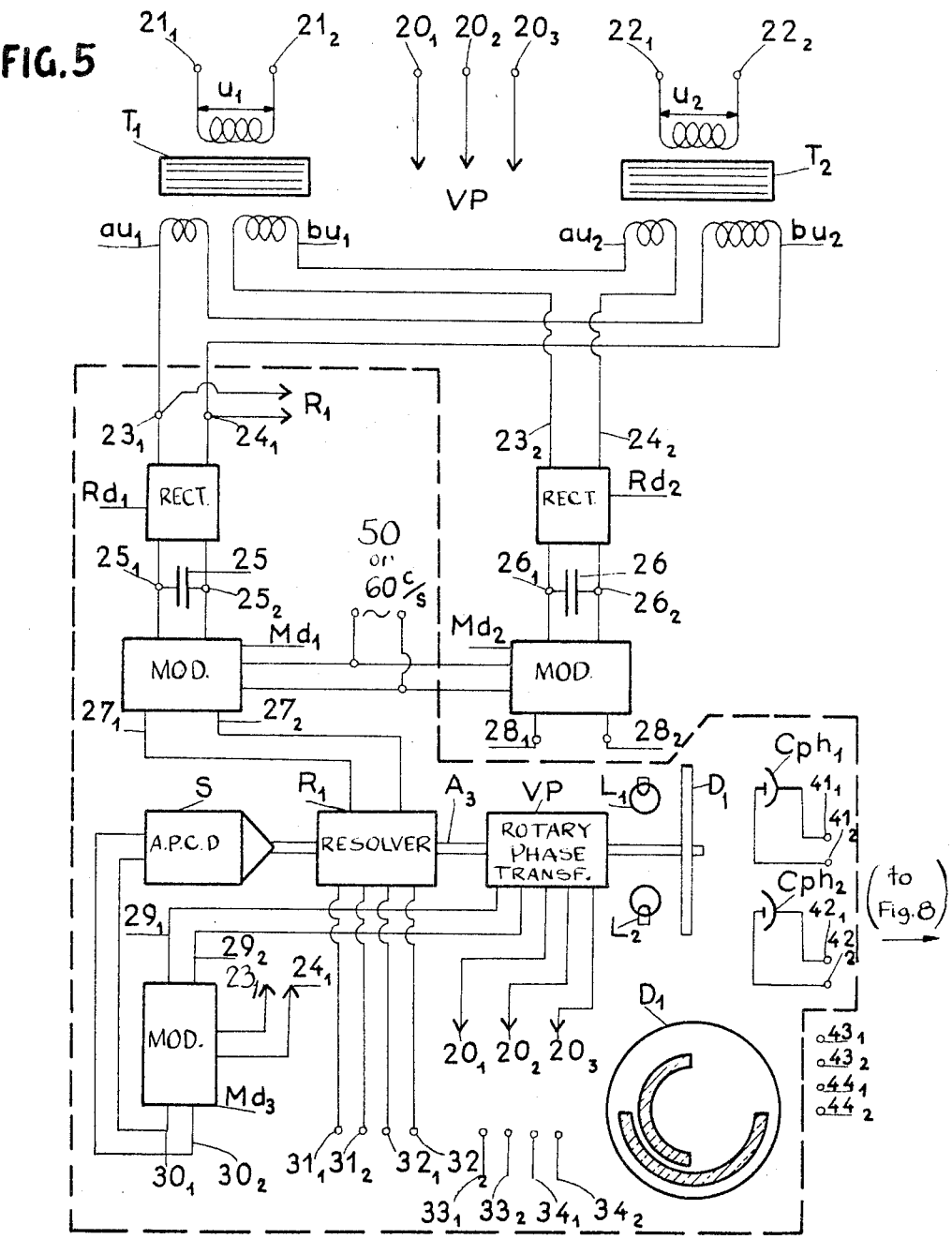
FIGURES 5 to 8 show various elements of FIGURE 2 in a more detailed manner.

FIGURE 5 shows in detail only half of the elements of $K_1$, because the operations performed on $v_1$ and $v_2$, respectively, are similar and are made by means of similar devices.

In the diagram of FIGURE 5, the voltages $u_1$ and $u_2$ of fixed frequency $f_0$ (for example 15 c./s.) coming from E (FIGURE 2) are applied to the pairs of terminals ($21_1$, $21_2$) and ($22_1$, $22_2$), respectively. Each of these pairs of terminals is connected to the primary winding of a transformer $T_1$ or $T_2$ provided with two secondary windings ($S_{11}$ and $S_{12}$ or $S_{21}$ and $S_{22}$) whose ratios of number of turns to that of the primary winding are respectively equal to the numerical coefficients $a$ and $b$ defined hereinbefore. Due to the interconnections in series of the secondary windings shown in the drawing, there are thus obtained between the points ($23_1$, $24_1$) and ($23_2$, $24_2$) of FIGURE 5, respectively, the voltages $v_1$ and $v_2$ defined by the relations (2).

For performing the calculation represented by the Formulae 3, it is necessary to determine electrically the amplitudes $V_1$ and $V_2$ of $v_1$ and $v_2$, as well as their phase angles $\theta_1$, $\theta_2$ relative to a fixed reference phase defined from $u_0$.

The first of these operations is performed by means of two rectifiers, $Rd_1$, $Rd_2$, for example of bridge type, delivering at their outputs to condensers 25, 26 of capacity sufficient to form at their terminals direct-current voltages practically free from ripple. At the terminals $25_1$, $25_2$, $26_1$, $26_2$, of 25 and 26, respectively, there are thus obtained the quantities $V_1$ and $V_2$ or at least direct-current voltages proportional to them, with a proportionality coefficient differing little from unity.

With a view to their subsequent utilisation and for facilitating the calculation represented by Formula 3, the voltages at teh terminals 25, 26 are transformed by balanced modulators $Md_1$ and $Md_2$, fed by a 50 c./s. current, into 50 c./s. alternating-current voltages of the same phase, whose amplitudes are respectively proportional to $V_1$ and $V_2$. The calculation of the four quantities defined by the Formulae 3 is performed by devices of commercial type known as "resolvers" (sometimes also called "synchro-trigonometers"). In known manner, these devices, the construction of which is similar to that of a two-phase alternating-current motor, comprise a single-phase rotor winding and two stator windings, alike but displaced by an angle of 90° around their axis of rotation. The windings are so constructed that when the rotor winding is fed with an alternating-current voltage of amplitude V, electromotive forces proportional to V cos $\theta$ and V sin $\theta$ are set up in the fixed windings in question, $\theta$ being the angular spacing between the position of the rotor and a reference position. Therefore, by connecting the rotor winding of the resolver $R_1$ to the output terminals $27_1$, $27_2$ of the modulator $Md$, there will be obtained at the terminals $31_1$, $31_2$, $32_1$, $32_2$ of the stator windings of $R_1$ alternating-current voltages respectively proportional to amplitudes of $V_1 \cos \theta_1$, provided that the rotor of $R_1$ is constrained to assume an angular position such that the angle $\theta$ defined hereinbefore is equal to $\theta_1$. This latter condition is realised as follows:

The mechanical axis of the rotor of $R_1$ is coupled directly to that of a "phase variometer" VP (rotary phase transformer). This latter device is of construction similar to that of an alternating-current motor having a three-phase stator winding and a single-phase rotor winding. The terminals of the stator winding of VP are connected to the terminals ($20_1$, $20_2$, $20_3$) to which is applied the three-phase voltage $u_0$ of frequency of $f_0$ coming from E (FIGURE 2). According to the angular position of the rotor of VP (FIGURE 5) with respect to its stator, there is obtained at the terminals $29_1$ $29_2$ of the rotor winding of VP a voltage $v_3$ of frequency $f_0$ and constant magnitude but of phase varying as the angular spacing of this rotor relative to a fixed position, because the magnetic field developed by the stator windings of VP is a constant field rotating at uniform angular velocity. A phase comparator formed by a modulator $Md_3$ receives at its two inputs, on the one hand the voltage $v_1$ from ($23_1$, $24_1$), on the other hand the voltage $v_3$ supplied by the rotor winding of (VP). There is thus obtained at the output terminals $30_1$, $30_2$ of $Md_3$ a direct-current voltage, the magnitude and polarity of which depend on the relative phases of $v_1$ and $v_3$, and which passes through zero with change in polarity when $v_1$ and $v_3$ are in phase quadrature. By subjecting the position of VP to the condition that the output voltage of $Md_3$ is zero, it is therefore possible to obtain the desired result, namely, that the angular displacements of the rotor of VP, and consequently those of the rotor of $R_1$, reproduce the variations of the angle $\theta_1$, and even that the angle $\theta$, defined above for $R_1$, is equal to $\theta_1$, for a suitable relative setting of the shafts of VP and $R_1$. At the same time, this setting may furthermore be selected so as to take into account the angle $\alpha_0$ mentioned above, that is to say to take into account the angular setting of the alternator supplying $u_0$ relative to the machining directions such as $W_1$, $Z_1$ (FIGURE 4).

The control is effected by the device S (FIGURE 5).

Various position control devices for obtaining the desired result are well known. One of the simplest is shown diagrammatically in FIGURE 6.

Figure 6:
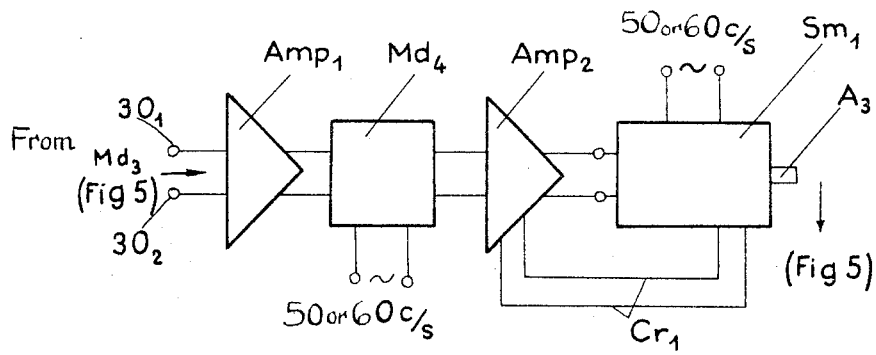

In FIGURE 6, the output terminals $30_1$, $30_2$ of the balanced modulator $Md_3$ feed, if necessary by means of a direct-current amplifier $Amp_1$, one of the inputs of another balanced modulator $Md_4$, fed at its second input with a 50 c./s. alternating-current voltage. In known manner, there is obtained at the output of $Md_4$ an alternating-current voltage of magnitude proportional to that of the direct-current voltage applied to the input of $Md_4$ connected to the output of $Amp_1$, and the phase of which changes abruptly by 180 degrees when the polarity of the voltage applied to the input of $Amp_1$ is reversed. The alternating-current voltage obtained at the output of $Md_4$ is amplified by a further amplifier $Amp_2$, and at the output of the latter is applied to a servomotor unit $Sm_1$, which comprises, coupled to a common shaft, a two-phase alternating-current motor with short-circuited rotor and an alternating-current tachometric generator of the "induction" type; this generator comprises two windings not coupled to each other when the machine is at rest, one of which is fed with an alternating-current voltage (for example at 50 c./s. by the alternating-current mains) and the other, called "output winding," is the seat of an induced alternating electromotive force proportional to the speed of rotation of this machine, and the phase of which changes by 180 degrees with the direction of this rotation. One of the two windings of the motor stator is fed with 50 c./s. current by the mains, possibly through a condenser for imparting to this current a suitable phase shift relative to the 50 c./s. current passing through the other of the two windings, which current is supplied by the output circuit of the amplifier $Amp_2$. Finally, the voltage of the output winding of the tachometric generator is applied by means of a reaction (also called "feedback") circuit $Cr_1$ to the input stage or to an intermediate stage of the same amplifier with a direction of connection such that this latter voltage tends to oppose the action of the alternating-current voltage applied to the input of he amplifier by the modulator $Md_4$. It is well known that under these conditions, the system assumes a well-defined equilibrium position corresponding to zero signal at the input of $Amp_2$, therefore to zero voltage at the output of $Md_3$ and in consequence of the quadrature of the phases of the two alternating-current voltages feeding $Md_3$. The angular position of VP (FIGURE 5), the shaft $A_3$ of which is coupled through a speed reducing gear comprised in $Sm_1$ to the abovementioned common shaft, therefore reproduces the phase angle $\theta_1$ defined in the foregoing.

The angular position of the resolver $R_1$, mounted on the same shaft $A_3$ as VP, being thus fixed by the control device S (FIGURE 5), there are obtained at the pairs of output terminals ($31_1$, $31_2$) and ($32_1$, $32_2$), respectively, alternating-current voltages of amplitudes $x_1$ and $y_1$, represented by the Formulae 3.

In the device of FIGURE 5, the alternating-current voltage developed at the output terminals ($28_1$, $28_2$) of $Md_2$ is treated, in a second set of devices, in a manner exactly like that effected for the output voltage of $Md_1$ in the assembly of the devices which have just been described. There are thus obtained at the pairs of output terminals ($33_1$, $33_2$), and ($34_1$, $34_2$) alternating current voltages of amplitudes $x_2$ and $y_2$ given by the Formulae 3.

These various alternating-current voltages are evidently of either of two opposite phases according to the algebraic sign of the coefficient of $V_1$ or $V_2$ corresponding to them in the Formulae 3, but for simplicity of language, it will be agreed hereinafter to consider them as being all of the same phase, but having positive or negative amplitudes depending on whether the sign in question, which is that of the quantities $x_1$, $y_1$, $x_2$ or $y_2$, is itself positive or negative.

There will also be noted on the shaft $A_3$ common to VP and $R_1$ (FIGURE 5) a circular disc $D_1$. This disc, better shown in projection on a plan perpendicular to the axis of $A_3$ in the lower part of FIGURE 5, comprises two semicircular slits arranged as shown. These slits are illuminated by light sources $L_1$, $L_2$, the luminous flux of which passes through either of these slits, or through both slits, or is completely intercepted, according to the value of the angle $\theta_1$ defining the position of $D_1$. Consequently, one or the other or both of the photoelectric cells $Cph_1$, $Cph_2$ are illuminated or neither of them is illuminated. The direct currents, delivered by these photoelectric cells, possibly after amplification, produce at the pairs of terminals ($41_1$, $41_2$) and ($42_1$, $42_2$) respectively, direct-current voltages each capable of separately assuming a constant value $V_0$ or of being zero, depending on whether the angle $\theta_1$ is included in one or the other of the four quadrants 0–90, 90–180, 180–270 or 270–360 degrees. It is thus possible to cause a different combination of the two voltages present or absent at the aforesaid pairs of terminals to correspond to each of said quadrants, and consequently to each of the four possible combinations of the algebraic signs of (sin $\theta_1$) and (cos $\theta_1$), hence of the signs of $x_1$ and $y_1$.

Likewise, a similar installation to that just described, provided for the treatment of the output voltage of $Md_2$ delivers to the pairs of terminals ($43_1$ and $43_1$) and ($44_1$, $44_2$) one of the four possible combinations of two direct-current-voltages of value $V_0$ or zero according to the algebraic signs of (sin $\theta_2$) and (cos $\theta_2$), hence according to the algebraic signs of $x_2$ and $y_2$.

It should of course be understood that some of the devices included in the installation of FIGURE 5, such as the angular position control device, are not necessarily of the type described, and that the subjection to the phase angles $\theta_1$ and $\theta_2$ of the positions of the resolvers such as $R_1$ and of devices, such as the phase variometer VP and the disc $D_1$, which are connected mechanically to it, could be effected by means of servomotors of any type, utilizing for example direct currents or others. The solution proposed in the foregoing is, however, one of the simplest and advantageous from the practical point of view. The constitution of the hybrid computer $K_2$ and that of the logical circuit CL of FIGURE 2 will now be described in detail by means of FIGURES 7 and 8. Before describing them in greater detail, however, it is expedient in the first place to explain the function of $K_2$.

We have seen in the foregoing that when some of the primary correction data $x_1$, $y_1$, $x_2$, $y_2$ are negative, it is necessary, due to the fact that it is impossible to make an application of material in the portions of the part (hereinafter called "normal correction zones") which they concern, to replace them by another group of "secondary correction data" $X_1$, $Y_1$, $X_2$, $Y_2$, $X_0$, $Y_0$ always all positive or zero, of which the first four are applied to the same normal zones and the last two are applied to other portions of the part (hereinafter called "complementary correction zones") where a removal of material is equivalent to an application, impossible to carry out in the normal zones. This has already been explained in connection with FIGURE 3 where the "normal correction zones" are the external surfaces of the counterpoises $Cp_1$ and $Cp_2$, and where the "complementary correction zones" are the external surfaces of the counterpoises $Cp_3$ and $Cp_4$, hereinafter assumed to be replaced, for simplicity of argument, by a single central counterpose $Cp_0$, affected by corrections $2X_0$, $2Y_0$.

The function of the computer $K_2$ is to effect the transformation giving the values of the six variables $X_1$, $Y_1$, $X_2$, $Y_2$, $X_0$, $Y_0$ as a function of those of $x_1$, $y_1$, $x_2$, $y_2$. For the desired balancing to be effected, this transformation must be done while observing the following rules:

(a) If $x_1$, $x_2$, $y_1$, $y_2$ are all positive or zero, $X_1$, $X_2$, $Y_1$, $Y_2$ are respectively equal to $x_1$, $x_2$, $y_1$, $y_2$ and $X_0$ and $Y_0$ are zero.
(b) If $x_1$ is positive or zero and $x_2$ negative, then: $X_1 = x_1 - x_1$; $X_2 = 0$; $X_0 = -x_2$.
(c) If $x_1$ is negative and $x_2$ positive or zero, then: $X_1 = 0$; $X_2 = x_2 - x_1$; $X_0 = -x_1$.
(d) If $x_1$ and $x_2$ are both negative, then: $X_1 = -x_2$; $X_2 = -x_1$; $X_0 = -(x_1 + x_2)$ Rules similar to the foregoing apply to $y_1$, $y_2$, $Y_1$, $Y_2$ and $Y_0$.

Figure 7:
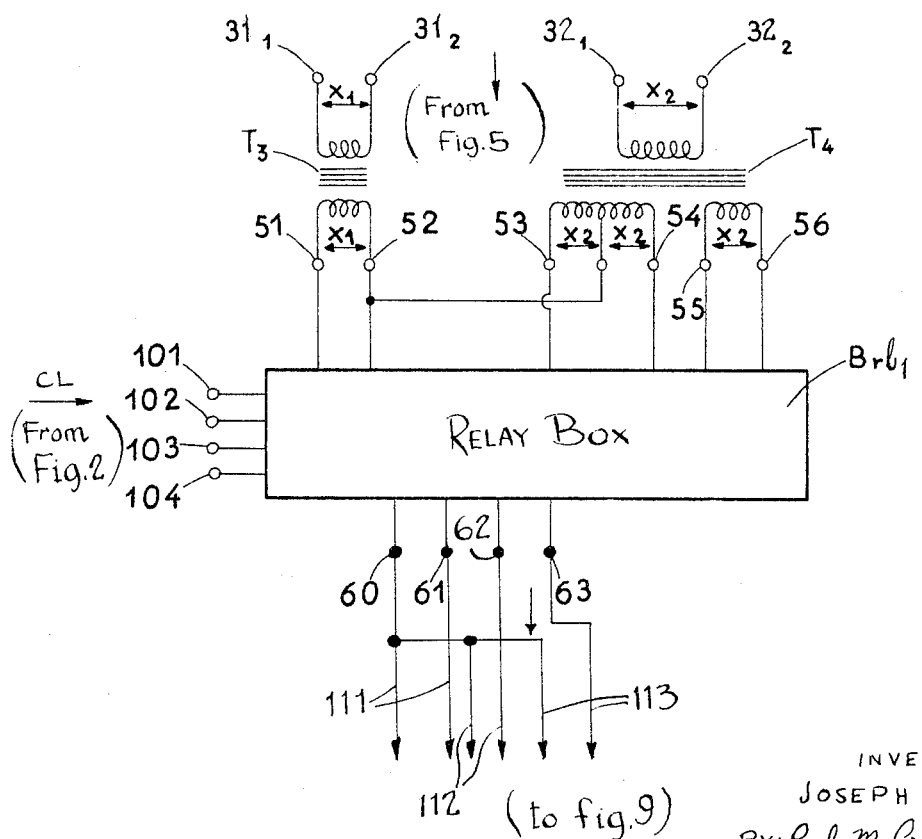

Referring now to FIGURE 7, the latter shows two transformers $T_3$ and $T_4$, whereof the pairs of terminals ($31_1$, $31_2$) and ($32_1$, $32_2$) of the primary windings are respectively fed by voltages of amplitudes $x_1$ and $x_2$ coming from the pairs of terminals ($31_1$, $31_2$), ($32_1$, $32_2$) of $K_3$ indicated by the same reference numerals in FIGURE 5, to which they are connected by the two-wire connections 31 and 32 (FIGURE 2). $T_3$ comprises a single secondary winding supplying the voltage $x_1$, while $T_4$ comprises three secondary windings each supplying a voltage $x_2$. These various secondary windings are interconnected as indicated in FIGURE 7, such that we have:

Between the terminals 51 and 52, the voltage $x_1$.
Between the terminals 51 and 53, the voltage $(x_1 - x_2)$.
Between the terminals 51 and 54, the voltage $(x_1 + x_2)$.
Between the terminals 55 and 56, the voltage $x_2$.

The four voltages thus obtained are applied to six corresponding input terminals of a relay box $Brl_1$, containing four relays, the excitation windings whereof are controlled by the two-wire connections 101 to 104 coming from CL (FIGURES 2 and 7), each of these relays having an on-position and an off-position and in addition five pairs of contacts. It is easy to see that it is thus possible to obtain, by means of these five pairs of contacts and between the common output terminal 60 on the one hand and each of the three output terminals 61 to 63 of $Brl_1$ on the other hand, the various voltages $X_1$, $X_2$, $X_0$ defined in the foregoing, with the desired algebraic sign, on condition that the contacts of the various relays suitably interconnect the terminals 60 to 63 and the terminals 51 to 56, with only one relay in the on-position in each of the above-mentioned cases (a), (b), (c), (d). From such terminal pairs as (60, 61), (60, 62), (60, 63) of FIGURE 7, the voltages $X_1$, $X_2$, $X_0$ are respectively directed by the two-wire connections 111, 112, 113 (FIGURES 2 and 7) to the coder $K_3$ of FIGURE 2, part of which is shown in greater detail in FIGURE 9.

An exactly similar device delivers the voltages $Y_1$, $Y_2$, $Y_0$ to the output terminals of a second relay box (not shown in the drawing), from input connections (33, 34) of $K_2$ supplying it with the voltages ($y_1$, $y_2$) from $K_1$ (FIGURE 2). This second relay box is controlled from CL by the two-wire connections 105 to 108 (FIGURE 2).

The voltages $X_1$, $Y_1$, $X_2$, $Y_2$, $X_0$, $Y_0$ thus obtained at the output of $K_2$ are finally applied by the two-wire connections 111 to 116 to the coder $K_3$ (FIGURE 2), where they are utilised as will be explained later. Before proceeding to the detailed description of $K_3$, however, it will be necessary to explain the form of construction and operation of the logical circuit CL of FIGURE 2 by means of FIGURE 8 which shows it in detail.

As we have seen above, the circuit CL receives from the pairs of terminals ($41_1$, $41_2$) to ($44_1$, $44_2$) of $K_1$ (FIGURE 5) by the two-wire connections 41 to 44 (FIGURE 2), four direct-current voltages, each of which has the value $V_0$ or zero depending on whether the sign of each of the quantities $x_1$, $x_2$, $y_1$, $y_2$ is positive or negative (when any one of these quantities is zero, the corresponding direct-current voltage is also zero).

Figure 8:
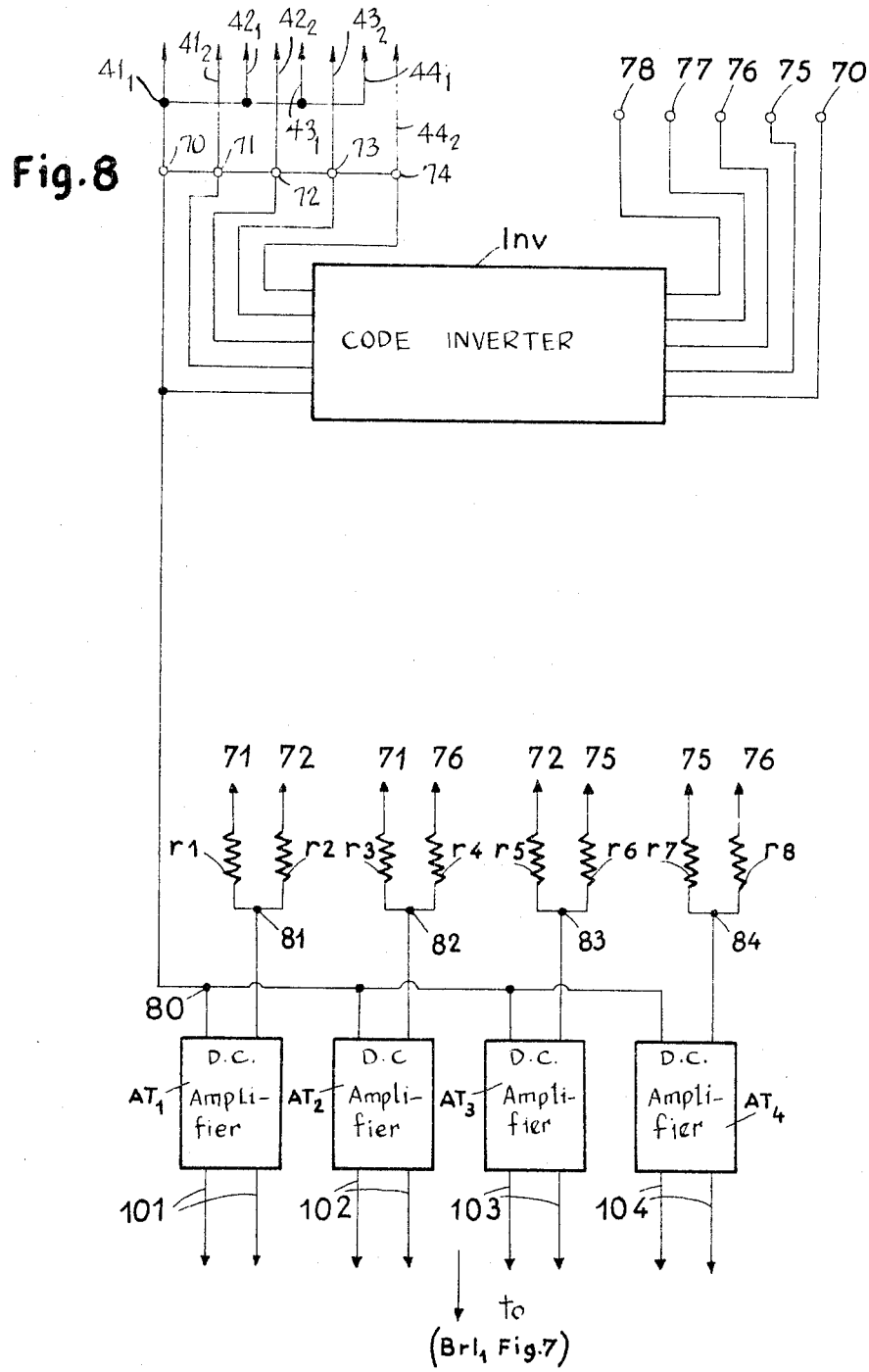

In the device CL, of which FIGURE 8 represents a partial diagram, the four direct-current voltages in question are applied between a common terminal 70 and each of the four terminals 71, 72, 73, 74, respectively.

These four voltages are to be used for controlling the relays of the two relay boxes such as $Brl_1$ mentioned in connection with FIGURE 7. More precisely, these voltages are used in a manner such that for each possible distinct combination of their values, only one of the relays is fed in each of the two boxes in reference.

For this purpose, a device called a "code inverter" $Inv$ (FIGURE 8) of any known type (set of relays, electronic bistable circuits or others) fed at its input with the voltages developed between the terminals 70 and 71 to 74 produces between said terminal 70 and the terminals 75 to 78 direct-current voltages called "complementary" of the first-mentioned. In other words, if at a given instant the voltage between 71 and 70 has the value $V_0$, the voltage between 75 and 70 has zero value, and vice versa. The same also applies to the couples of pairs of terminals 70–72 and 70–76, 70–73 and 70–77 and 70–74 and 70–78. Considering the voltages at the terminals 71 to 74 as constituting a group of coded signals, the voltages presented at the terminals 75 to 78 (always taken relative to terminal 70 regarded as reference potential point) form the coded group complementary of the foregoing.

Furthermore, it is well known in the theory of binary coding systems that if there are available at $2p$ terminals a group of $p$ coded voltages of a prior unknown composition, each of which may have only the values $V_0$ or zero and its complementary group, one or the other of these latter groups may be identified by seeking among all the combinations of $p$ terminals taken from the preceding $2p$ terminals, the only combination for which all the component voltages are zero. There exists only one such combination, differing from one group to another, which corresponds to any one of the $2^p$ possible coded groups.

In the present case, however, we are not considering the voltages present at 71, 72, 73, 74 as forming a coded group having four elements. In fact, since the operations to be performed on the sets of variables ($x_1$, $x_2$, $X_1$, $X_2$, $X_0$) and ($y_1$, $y_2$, $Y_1$, $Y_2$, $Y_0$) do not involve any action of one of these sets on the other, it is preferable to treat the first coded sub-group of 2 elements formed of the voltages at 71 and 72 with its complement formed of the voltages at 75 and 76, on the one hand, and the second sub-group formed of the voltages at 73 and 74 with its complement formed of the voltages at 77 and 78, on the other hand, as forming two absolutely distinct systems.

There are thus formed, for the first of these systems, the four combinations of voltages present at 71, 72, 75, 76, as shown in FIGURE 8, by associating two by two the terminals whose parity of numbers is different. The voltages thus obtained via the eight resistances $r_1$ to $r_8$ between 81, 82, 83 and 84 and the common terminal 80 connected to 70 are respectively applied to the inputs of four transistorised direct-current amplifiers $AT_1$, $AT_2$, $AT_3$, $AT_4$, the output currents of which feed respectively by means of the two-wire connections 101 to 104 each of the four relays contained in the box $Brl_1$ (FIGURE 7). It is obviously possible to select the directions of application of the direct-current voltages received at the inputs of the four amplifiers concerned in such a manner that they tend to suppress the output currents of these devices. Thus, only that of the amplifiers corresponding to the combination of two zero voltages at two of the terminals 71, 72, 75, 76 (FIGURE 8) will retain an output current capable of feeding one of the relays and energizing it. As explained in the foregoing, there is only one such combination for each of the possible compositions of the first coded sub-group. For each of these distinct compositions—and consequently for each possible combination of the algebraic signs of the variables $x_1$ and $x_2$—there is therefore in the box $Brl_1$ (FIGURE 7) one and only one energized relay; this relay, becoming operative, transmits to the output terminals 61 to 63 of $Brl_1$ the appropriate combination of the voltages $X_1$, $X_2$, $X_0$ (taken relative to the common terminal 60) computed in each of the cases (a), (b), (c), (d) by means of the formulae given above.

The variables $y_1$ and $y_2$, whose algebraic signs are represented by the direct-current voltages applied to the terminals 73, 74, 77 and 78 (FIGURE 8) are treated in a similar manner in an apparatus like that of FIGURE 7, controlled by a device analogous to that of FIGURE 8 and included in the logical circuit CL. The transformed voltages $Y_1$, $Y_2$, $Y_0$ likewise appear at the output connections 114 to 116 of $K_2$ (FIGURE 7).

The secondary correction data thus obtained, represented by the alternating-current voltages $X_1$, $Y_1$, $X_2$, $Y_2$, $X_0$, $Y_0$, have yet to undergo a non-linear transformation for being translated into the final machining data, and then finally for being digitally coded. These two operations are carried out as follows:

(1) Denoting by X the magnitude of any one of the preceding voltages and $X_m$ its maximum possible magnitude, an angle $\beta$ is made to correspond to X, the angle $\beta$ being defined by $$X_m \sin \beta = X \sin \beta_0 \qquad (4)$$

where $\beta_0$ is an angle which is fixed once and for all and $\beta$ being materialised by the angular distance between the position of a first mechanical shaft and a reference position. The angular position of this shaft is subjected to the ratio $(X/X_m)$ by a servomechanism described below:

The rotation of the shaft concerned drives that of a second shaft by means of a mechanism producing a non-linear angular transformation allowing another angle $\beta_1$ to correspond to the angle $\beta$, according to a desired non-linear law. This law, selected in accordance with shape of the part to be machined and that of the tool, may be materialised by the use in the said mechanism of a cam, the variation of the radius of which is suitably calculated as a function of the angle of rotation. The said mechanism does not form part of the present invention and may be of any known type. The resulting non-linear transformation has the effect, taking relation (4) into account, that a value of $\beta$, directly constituting a machining datum, proportional for example to the distance of penetration of the tool, is made to correspond to a given value of X.

(2) The digital coding, that is to say the translation into binary digits of the value of the angle $\beta_1$ is effected by a coder having a rotating disc and photoelectric cells. This coder substantially uses a circular disc fastened to the second above-mentioned shaft and having its axis of rotation coinciding with that of said shaft. If it is desired to use a code having 128 values ($128=2^7$), for example, the disc carries seven tracks, each limited by two circles centered on the axis and all limited angularly by two extreme radii common to them and having an angular spacing equal to the total movement of the disc. Each track comprises alternate solid parts and openings of equal dimensions. Thus, for example, if the angular extension common to all the tracks is 256 degrees, the first track will comprise a solid part covering an angle of 128 degrees and an opening also covering an angle of 128 degrees; the second track will comprise two alternate solid parts and two openings of 56 degrees, and so forth, up to the seventh track which will have 56 alternate openings and 56 solid parts each of 2 degrees. Under these conditions, a radius forming an angle $\beta_1$ degrees with one of the extreme radii limiting the abovementioned angle of 256 degrees will intersect successively openings and solid parts, the arrangement of which will represent, if the digit 1 is made to correspond to the former and the digit 0 to the latter, the nearest whole number to $(\beta_1/2)$ expressed in binary notation. By associating with each track a photoelectric cell which is or is not illuminated by a light source according to whether the flux passes through the disc or is stopped, that is to say, according to the angular position of said disc, the whole of the intensities of the seven direct currents of the various cells, which intensities are assumed to be able to have only the value 0 or a constant value conventionally selected as unity, will represent the same binary number.

In the binary coding device just described, the openings and the solid parts of the disc may be replaced respectively by transparent and opaque parts if the disc is made of transparent material.

The currents of the photoelectric cells, if necessary amplified, produce at the output connections 1 to 6 of $K_3$ (FIGURE 2) direct-current voltages which assume only zero value or a constant value. For each of the six machining data, there are seven such voltages; each of the connections 1 to 6 therefore comprises seven pairs of conductors.

The manner in which the angle $\beta$ (and hence the angle $\beta_1$) is subjected to the value of X according to the relation (4) given in the foregoing will now be explained with reference to FIGURE 9.

We have already seen that the alternating-current voltage X has an amplitude capable of varying between O and $X_m$; furthermore, it has a constant phase depending only on that of the 50 c./s. source which feeds the installation of FIGURE 5.

Figure 9:
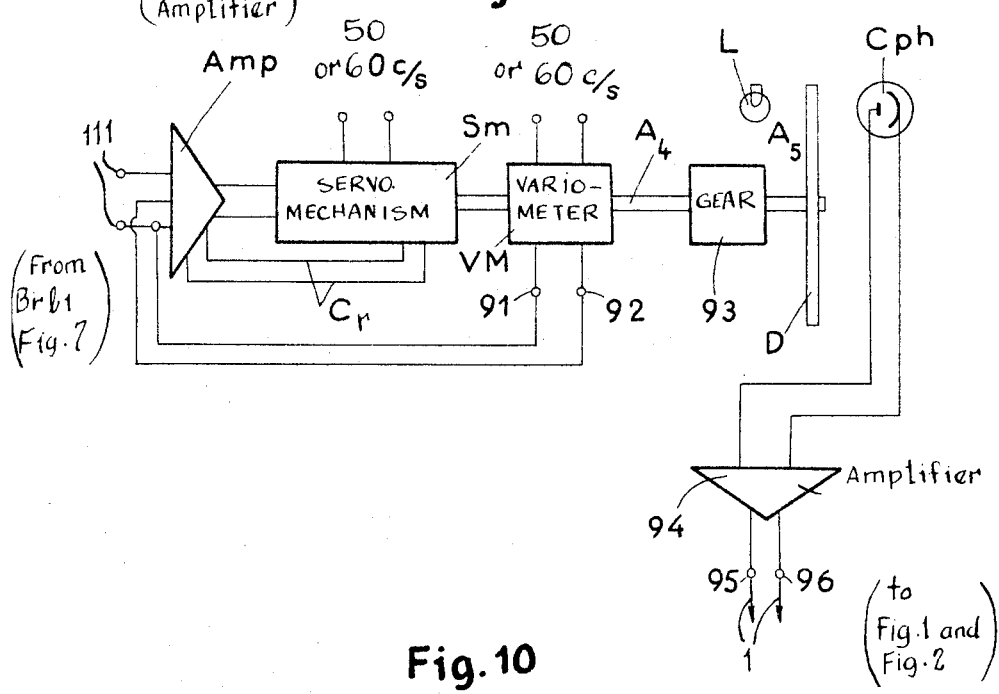
FIGURE 9 shows diagrammatically the organization of an angular position and coding control device used in certain parts of the installation of FIGURE 2.

Referring to FIGURE 9, the principal element of the latter is a variometer VM. By variometer is understood an assembly of two coils, one fixed and the other adapted to rotate relative to the first and the mutual inductance of which is a sinusoidal function of the angular spacing $\beta$ of the position of the movable coil relative to a fixed reference position. Such a device is provided in the simplest manner by one of the fixed windings and the rotor winding of a resolver of the type hereinbefore described. By applying an alternating-current voltage of the same phase as that of X and of suitable magnitude to the terminals of the fixed winding, it is possible to arrange for the voltage at the terminals of the rotor winding to assume the value $X_m$ when $\beta$ has a predetermined value $\beta_0$, which may be selected as 70 degrees for examples, so that sin $\beta$ is always positive when $\beta$ remains between O and $\beta_0$.

As will be gathered from FIGURE 9, the variometer is mounted on a common shaft $A_4$ with a servo-mechanism $Sm$ of the type already mentioned with reference to FIGURES 5 and 6. The motor of this servo-mechanism is fed on the one hand by a 50 c./s. fixed voltage, and on the other hand by the output current of the amplifier ($Amp$), to the input of which are applied in phase opposition the voltage X delivered through the two-wire connection 111 by the relay box $Brl_1$ (FIGURE 7) included in the computer $K_2$ (FIGURE 2) and that coming from the terminals 91, 92 of the winding of the rotor of VM. The reaction circuit $Cr$ fed by the tachometric generator of $Sm$ acts on the amplifier $Amp$, as already explained with reference to FIGURE 6.

Under these conditions, the system formed by (VM)

and (Sm) assumes an angular position $\beta$ such that the relation (4) is established.

The shaft $A_4$ common to $Sm$ and VM drives the primary shaft of the gear 93, which rotates the secondary shaft $A_5$ carrying the coding disc D, the angle of rotation of which is a suitably selected non-linear function of that of the shaft $A_4$ as already mentioned.

For simplicity of the drawing, FIGURE 9 shows only one of the photoelectric cells (numbering seven in the above example) associated with the coding disc D.

The light source L illuminates or does not illuminate the photoelectric cell $Cph$ according to whether the latter is in front of an opening or a solid part of D; the current of the cell, amplified by the amplifier 94, produces at the output terminals 95, 96 of 94 a direct current voltage which is zero or has a constant value, according to whether $Cph$ is illuminated or not. The voltage developed at the terminals 95, 96 feeds one of the pairs of conductors included in the output connections 1 to 6 of $K_3$ (FIGURES 1 and 2).

The coder $K_3$ (FIGURE 2) comprises as many devices of the type of FIGURE 9 as there are machining data, that is to say, in the present case six.

*Utilization of the coded machining data*

Reverting now to FIGURE 1, the operation of the installation shown in the figure, already partly explained in the foregoing, will be better understood when the production of the various electrical signals regulating the operation of the system has been described, said signals being hereinbefore called transfer signals, commencement of general machining signals and end of partial machining signals. These various signals are reproduced cyclically in the order in which they have just been enumerated.

At a given instant, the general control unit $B_0$ (FIGURE 1) transmits by the connection 16 a transfer signal constituted, for example, by a pulse of given polarity. This pulse has the effect of blocking the gate device $G_0$, previously in the conducting state, and of rendering the like devices $GI_1$, $G_1$, $GI_2$, $G_2$, $GI_3$ and $G_3$ conducting. These operations of blocking and unblocking are effected in the manner well known in the electronic computer art by bistable circuits of known type. At the same time, the pulse in question causes the passage into the memory device $MI_1$ of the binary coded data previously recorded in the memory device $M_0$, in the course of its cooperation with $G_0$ and the measuring unit comprising the test apparatus E and the computer K. Likewise, the data contained in $MI_1$ pass to $M_1$ and $m_1$, while those contained in $M_1$ pass into $MI_2$, in accordance with the known operation of shift registers using cascade-connected bistable circuits. At the end of this sequence of operations, the device $M_0$ has reverted to the state in which no more data are recorded therein and it is therefore ready to receive other data which will be subsequently supplied to it.

The same transfer signal initiates the operation of mechanical devices not forming part of the present invention and ensuring the passage of the parts from each test unit, storage unit or machining unit to the next. When all these parts have take up in each of these units their normal position, which position in the machining, test and final check units is strictly defined by the setting mentioned in connection with FIGURE 3, so as to ensure exact correspondence between the machining axes and the directions in which the out-of-balance of each of them has been measured, an appropriate electrical signal is supplied, for example by a relay, to the general control unit $B_0$ which having received it by the connection 13, then transmits a commencement of general machining signal. This signal, transmitted by the connection 16, may consist for example of a pulse of opposite polarity to that of the transfer signal for distinguishing it from the latter; or alternatively, the connection 16 may comprise several conductors connected to different points of the controlled devices. The general machining commencement signal unblocks $G_0$, blocks $G_1$, $GI_1$, $G_2$, $GI_2$ and $GI_3$, $G_3$, and at the same time by its connections such as 15 produces the starting of the motors of the tool support of the machine tools such as $MO_1$, by means of the switch box $B_1$ appropriate to this machine and connections such as 18 and 19. When a tool of $MO_1$ enters effectively into contact with the part to be machined, a mechanical or electrical device of any known type closes an auxiliary circuit which establishes a connection connecting to the counter $C_1$, by a connection such as 17, an electric pulse generator controlled by the movement of said tool.

The form of construction of this pulse generator will be explained in greater detail later in the present description; for the moment, it is sufficient to know that it transmits regularly spaced pulses in proportion to the feed of the tool with which it is associated, the number of pulses transmitted being proportional to the length of feed, with an arrangement such that the maximum length of the useful stroke of the tool corresponds, for example, to 127 pulses (in the case in which a seven digit code is used).

The counter $C_1$ and the local memory device $m_1$ are each composed of two identical halves, each corresponding to one of the machining data $X_1$, $Y_1$ (modified non-linearly and coded numerically as explained in the foregoing). When the general machining commencement signal has established a connection, such as 17, connecting the pulse generator corresponding to $X_1$ to the appropriate half of the counter $C_1$, the latter commences the counting of the pulses. This counting is effected in accordance with the binary code, in other words, the counter is formed of a set of bistable circuits, each of which controls the following one. It is known that the number of pulses received by such a counter creates therein a combination of states of the various bistable circuits such that by causing, for each circuit, one or the other of these states to correspond to the digits 0 and 1, respectively, the combination realized represents in binary notation said number of pulses.

By comparing electrically at any instant the stages of the same rank of the counter $C_1$ and of the memory device $m_1$, which is also formed of a set of bistable circuits representing by their positions the binary number corresponding to the value of $X_1$, it is possible by well known means to show the instant at which the states of all the stages of the same rank of one and the other of the devices are identical two by two. At this moment, a signal called "end of partial machining" signal is realised by the comparison system, represented in simplified manner in FIGURE 1 by the connection $17_1$, and is transmitted by the connection $17_2$ to the control unit $B_1$, which stops the corresponding motor by means of a relay or any other equivalent device. At the same time, the same end of partial machining signal is transmitted by the connection $17_3$ to the terminal 7 of the general control unit $B_0$, where it is registered and stored by any known means ("flip-flop" electronic multivibrator, relay with holding winding, etc.).

The other half of the counter $C_1$, in co-operation with a second pulse generator associated with the tool and with the part of the machine $MO_1$ which utilize the second machining datum $Y_1$, acts in a similar manner. When the partial machining carried out has had as result the transmission of a number of pulses corresponding to the value of $Y_1$, a device similar to that just described transmits another end of partial machining signal to the terminal 8 of $B_0$, were it is registered and stored. The same applies to the other machining data $X_2$, $Y_2$, $X_4$, $Y_4$ and for the corresponding tools, pulse generators, counters and local memory devices.

For simplicity of the drawings, FIGURE 1 does not show the connections analogous to 17, $17_1$, $17_2$ and $17_3$ connecting the second half of $C_1$ to $MO_1$, to $B_1$ and to the terminal 8 of $B_0$, nor the connections performing the same function for connecting $C_2$ and $C_3$ to the terminals 9 to 12 of $B_0$, nor the connections between the second halves of $C_2$ and $C_3$ on the one hand and $B_2$ and $B_3$, on the other. Their arrangement is quite similar to that described above in connection with the elements of $m_1$, $C_1$ and $MO_1$ concerned in the employment of the machining datum $X_1$.

When the six ends of partial machining signals have been received by $B_0$ at the various terminals 7 to 12, an electrical device of any known type detects their simultaneous presence and initiates a fresh transfer signal, which is directed by 16 to the various members which have to utilise it, as explained hereinbefore. At the same time, the register devices connected to the terminals 7 to 12 are returned to their original state.

The foregoing arrangements may be simplified somewhat in a preferred embodiment of the installation, wherein each counter and the local memory device associated with it are combined in one and the same device. The latter is then a binary counter having two inputs, one called a "series input," by which there is applied to it in succession those pulses to be counted which come from the pulse generator associated with the tool and machining datum concerned, the other called "parallel input," comprising as many pairs of connections as there are bistable stages in the counter. By means of these pairs of connections, it is possible, under the action of the transfer signal, to cause all the stages of the counter $C_1$ to pass simultaneously to the individual states corresponding to the registration of the data $X_1$, $Y_1$, supplied to it by $G_1$ from $MI_1$. By causing in known manner the series input of the counter to operate in pulse countdown, the counter (or rather each half thereof) is returned to zero indication when a machining operation is terminated. At this moment, an appropriate circuit, which is only rendered active at the instant at which this indication is verified, transmits by the connections $17_2$ and $17_3$ an end of partial machining signal acting, as explained in the foregoing, on the control of the tool motor and on the general control unit $B_0$.

A modification of the arrangement just described comprises, by means of an appropriate arrangement of the connections connecting $m_1$ to $MI_1$ via $G_1$, causing $C_1$ to register, before the commencement of machining, the binary number representing the difference between the maximum number which can be registered by the counter and the coded value of $X_1$ (or $Y_1$). It is known that in binary notation, this result is obtained by replacing all the digits 1 of a number by the digits 0 and vice versa. It is therefore merely necessary to cross the connections between $m_1$ and $MI_1$ to obtain the desired result. This having been done, counting of the pulses applied to the series input of $C_1$ brings the latter, when the number of pulses corresponding to the end of machining has been reached, to the position corresponding to the digit 1 for all the stages at once. The establishment of this position then initiates the end of partial machining signal, the function of which has already been explained. The transfer signal subsequently transmitted may be used for returning all the counters to zero if necessary.

Figure 10:
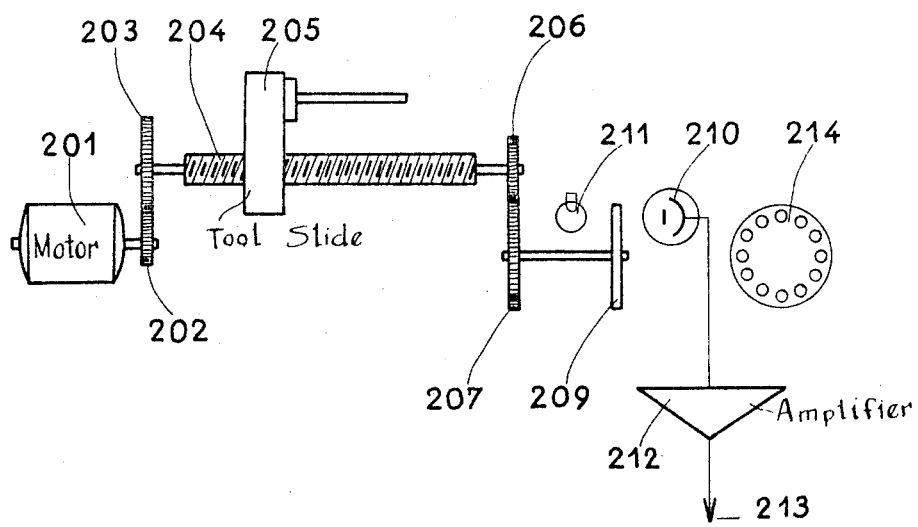
FIGURE 10 shows diagrammatically an electrical element for tool infeed supervision and control, and the way in which this element is used for the control of the general functioning of the machine of FIGURE 1 and for the particular control of certain members of that figure.

The pulse generator referred to in the foregoing, and the function of which is to transmit electrical pulses in a number proportional to the feed of the tool with which it is associated, will now be briefly described by means of FIGURE 10.

Referring to FIGURE 10, the electric motor 201 by means of pinions 202, 203 drives the leading screw 204, which in its turn drives the tool slide 205. The shaft of the leading screw 204 at the same time drives the pinions 206, 207, the second of which drives the disc 209. This disc, represented turned over at 214 in the right-hand part of the figure, carries near its periphery regularly spaced openings. The number of these openings and the ratio of the speed reduction of the pinions 206, 207 are selected so that the total length of useful stroke of the tool slide 205 corresponds to the passage, in front of the photoelectric cell 210, of a number of holes equal to the maximum number which can be registered by the pulse counter associated with the tool considered in the installation of FIGURE 1 (i.e., 127 in the example given above). The photoelectric cell 210 is illuminated by the light source 211 through one of the openings of 209, the passage of which generates a series of electrical pulses which are amplified in the amplifier 212 and thence sent by the connection 213 to the connection 17 of FIGURE 1, with which the connection 213 is connected, however, as mentioned in the foregoing, only by means of a contact device (relay or other device), which ensures connection only when the tool has already come into contact with the material it is to work.

Various constructional modifications of the invention will be evident for the skilled person. For example, it is possible to complete or replace the gate device $G_0$ of FIGURE 1 by a similar device establishing or suppressing under the same conditions and under the action of the same control signals the couplings ensured by the connections 21, 22 between the test apparatus E and the computer K (FIGURE 1). Other constructional modifications are also possible in the arrangement and embodiment of the various memory devices and pulse counters used in the installation of FIGURE 1, without departing from the scope of the invention.

An important variant of embodiment of the invention will still be described, which may be of practical interest when it is desired that changes in the shape of the parts to be machined or in that of the tools therefor can easily be made.

It has already been mentioned, in connection with FIGURE 9, that the mechanical coupling device 93 should preferably be so built as to ensure a suitable non-linear relationship between the angular motions of variometer VM and coder disk D. The non-linear character of this relationship results from the fact that if, for instance, the machining-tool is a conical milling cutter, the quantity of material removed at each turn of the tool increases as it penetrates more and more deeply into the machined part. Mechanical means, such as the use of cams, are well known for the embodiment of such a non-linear relationship.

An alternative solution consists in modifying the arrangement of the coder disk in such a way that the binary number represented by the coded signals generated by the said disk be a non-linear function of the rotation angle of the latter. To achieve this, it is sufficient that each circular coding track in the disk be provided with alternate transparent and opaque portions, the angular width of which varies with their position along this track, according to a properly selected variation law, determined by the desired non-linear relationship. A practical advantage of the latter solution is that, should the shape of the tool or that of the part to be machined be altered, one has just to change the coder disk for a different one conforming any new required linear or non-linear law.

It must also be understood that the above-description of the coding apparatus is but that of an example of embodiment. Of course, many other coder types could be used. If, for instance, a photoelectric coder is considered, the motion of its coding tracks might as well be a translation, that is to say a displacement parallel to a given direction, instead of a rotation. In the case of such a "rectilinear" coder, all tracks would consist of alternate transparent and opaque parts arranged along straight lines parallel to said direction on a plate of solid material, which would be driven from the shaft of variometer VM (FIGURE 9) through a rotation-to-translation transforming mechanism of any known description, designed according to the selected relationship between the angular displacement of WM and the linear displacement of the tracks.

Also, it is hardly necessary to say that the hereinabove described photoelectric coder might be replaced by an entirely mechanical one, of the known type using sliding contacts, generally arranged along circular lines. However, it is believed that photoelectric coders are less likely to wear and more reliable in the long run.

Transformation of the alternating voltages delivered at the output of the hybrid computer $K_2$ (FIGURE 2) into digital data could also be directly effected by known electrical circuits. The reason for the choice of a rather complicated process—transformation of voltage magnitude into the displacement of a mechanical system, followed by transformation of the latter motion into coded electric currents, is that it would hardly be possible otherwise to make the overall transformation to conform a predetermined and arbitrary non-linear law. As it is well known, the adjustment of an all-electrical system to such a law, except for some very simple forms of the latter, is a very difficult matter, and this all the more that a higher degree of constancy in time is required. On the contrary, accurate adjustment and high constancy are easily obtained in mechanical systems, as they only depend on the geometrical shape and size of such parts as pinions, cams, etc., which are intrinsically very stable elements.

I claim:

1. In an automatic machine for balancing mechanical parts with respect to a given rotation axis by removing material from predetermined portions of said parts, an electric control system comprising test means for translating the unbalance of said parts into a plurality of electric voltages, electric circuit means for deriving from said voltages analogue voltages, the amplitude of each one of which is proportional to the quantity of material to be removed from one corresponding of said predetermined portions, coding means for translating each said amplitude into a group of coded digital data representing a binary number according to a predetermined non-linear relationship between said amplitude and number, means for storing said group of coded digital data and means for causing said stored group of coded digital data to control the infeed of at least one corresponding tool proportionally to said binary number into one of said portions, wherein sadi coding means comprise servomechanism means for controlling the displacement of a first movable member with respect to a reference position, a coder including a second movable member, the position of which controls a plurality of electric currents each having one or the other of two possible intensity values, said currents constituting said group of coded digital data, and a mechanical linkage between said first and second movable members so arranged as to ensure said predetermined non-linear relationship between the respective displacements of said members.

2. An electric control system as claimed in claim 1, wherein the motion of said second movable member is a rotation motion.

3. An electric control system as claimed in claim 1, wherein the motion of said second movable member is a rectilinear translation motion.

4. In an automatic machine for balancing mechanical parts with respect to a given rotation axis by removing material from predetermined portions of said parts, an electric control system comprising test means for translating the unbalance of said parts into a plurality of electric voltages, electric circuit means for deriving from said voltages analogue voltages, the amplitude of each one of which is proportional to the quantity of material to be removed from one corresponding one of said predetermined portions, coding means for translating each said amplitude into a group of coded digital data representing a binary number according to a predetermined non-linear relationship between said amplitude and number, means for storing said group of coded digital data, and means for causing said stored group of coded digital data to control the infeed of at least one corresponding tool proportionally to said binary number into one of said portions, wherein said storing means comprise a multi-channel shift register having a plurality of successive stages, means for feeding each group of coded digital data to the first stage of one of said channels, means for controlling the operation of each one of a plurality of tools by one corresponding of said stages, an electric pulse counter, the condition of which is controlled by the motion of one of said tools corresponding to the last stage of one of said channels, and means controlled from said counter and said last stage for causing said coded data to be shifted from each said stage to the following stage.

5. In an automatic machine for balancing mechanical parts with respect to a given rotation axis by removing material from predetermined portions of said parts, an electric control system comprising test means for translating the unbalance of said parts into a plurality of electric voltages, electric circuit means for deriving from said voltages analogue voltages, the amplitude of each one of which is proportional to the quantity of material to be removed from one corresponding one of said predetermined portions, coding means for translating each said amplitude into a group of coded digital data representing a binary number according to a predetermined non-linear relationship between said amplitude and number, means for storing said group of coded digital data, and means for causing said stored group of coded digital data to control the infeed of at least one corresponding tool proportionally to said binary number into one of said portions, wherein said electric circuit means comprise analogue computer means linearly transforming said electric voltages delivered by said test means into further voltages, means for proportionally deriving from said further voltages a plurality of other voltages, and hybrid computer means having a plurality of different connection conditions corresponding to different linear combinations for combining said other voltages into said analogue voltages, said different connection conditions being selectively controlled by switching means operated from a logic circuit the condition of which is controlled by the whole of said other voltages.

6. In an automatic machine for balancing a mechanical part with respect to a given rotation axis by removing material from a number of predetermined portions of said part, an electric control system comprising, in combination, (a) test means including a source of reference alternating voltage of a first given frequency and electromechanical means for translating the unbalance of said part with respect to said axis into a plurality of alternating voltages of said first frequency, (b) analogue computer means for linearly transforming said plurality of alternating voltages into a plurality of further alternating voltages of said first frequency each having a phase angle with respect to said reference voltage, (c) means for converting each one of said further alternating voltages into a corresponding proportional alternating voltage of a second given frequency, (d) a plurality of voltage translating devices each having an input and two outputs and a controllable voltage transfer coefficient between said input and each said output, said coefficient being controlled in each one of said translating devices by the phase relationship between said reference voltage and one corresponding of said further voltages of said first frequency, means for applying to the input of each one of said translating devices that one of said proportional voltages of said second frequency which corresponds to latter said corresponding one of said further voltages, and means for receiving at each one of said outputs a derived voltage of said second frequency having an amplitude proportional to that of said one of said proportional voltages and one or the other of two opposite phase conditions according to said phase relationship, (e) a logic circuit having a number of different operating conditions at most equal to a power of two equal to the total number of all said derived voltages, said operating conditions being controlled by a plurality of direct-current supplying devices, each one of which is controlled from the output of a corresponding one of said voltage translating devices and delivers a direct current having one or the other of two possible intensity values according to the phase condition of the derived voltage received at latter said output, said logic circuit comprising input terminal pairs for applying said direct currents thereto and output terminal pairs for delivering further direct currents, (f) hybrid computer means for linearly combining the whole of said derived voltages into a plurality of analogue alternating voltages of said second frequency, said hybrid computer means causing a different combination to be produced for each operating condition of said logic circuit, (g) means for translating the amplitude of each one of said analogue alternating voltages into a group of digital coded data, memory devices for storing said data, and electromechanical means for causing said stored data to control the operation of tools machining above-said predetermined portions, wherein said analogue computer comprises a plurality of transformers each having a primary winding and at least one secondary winding, means for respectively applying each one of said other voltages to one of said primary windings, switching means operated from said further direct currents from said logic circuit for series-connecting at least part of said secondary windings, and means for receiving said analogue voltages across at least part of said secondary windings and series-connected windings.

7. An electric control system as claimed in claim 6, wherein said analogue computer means for transforming said plurality of alternating voltages of said first frequency into said further voltages include a plurality of further transformers each having a primary winding fed from one of said voltages to be transformed and at least one secondary winding, connections for series-connecting at least part of said secondary windings of said further transformers, and means for receiving said further voltages across at least part of said secondary windings and series-connected windings.

8. An electric control system as claimed in claim 6, wherein said means for converting each said further voltage of a first frequency into a proportional voltage of a second frequency include a linear modulator.

9. An electric control system as claimed in claim 6, wherein each said translating device includes a resolver having fixed and rotating windings, servomechanism means for controlling the angular position of said rotating windings by one of said further voltages and by said reference voltage in accordance with the phase angle therebetween, means for feeding part of said windings from said proportional alternating voltage corresponding to latter said further voltage, and means for receiving said derived alternating voltages across another part of said windings.

10. An electric control system as claimed in claim 6, wherein each one of said direct current supplying devices is controlled by control means mechanically linked with the shaft of a resolver.

11. An electric control system as claimed in claim 6, wherein said translating devices include resolvers each having a rotating shaft the angular position of which is controlled by one corresponding of said further voltages and by said reference voltage in accordance with the phase angle therebetween, and wherein the currents delivered by at least part of said direct-current-supplying devices are further electromechanical control by control means mechanically linked with said shaft or shafts of said resolvers.

12. An electric control system as claimed in claim 6, wherein said switching means consist of a number of electromechanical relays energized by said further direct currents received at an equal number of output terminal pairs of said logic circuit.

13. An electric control system as claimed in claim 6, wherein said logic circuit includes input terminal pairs of each fed from one of said direct current supplying devices, a network made of resistances and interconnecting said input terminal pairs with further terminal pairs in number equal to that of said operating conditions of said logic circuit, and direct current amplifiers each having input terminals connected to one corresponding of said further terminal pairs and output terminals feeding at least one winding of an electromechanical relay included in said switching means.

14. An electric control system as claimed in claim 6, wherein said means for translating the amplitude of each one of said analogue voltages into a group of coded data comprise a rotating induction variometer having a fixed and a rotating winding, means for applying a fixed voltage of said second given frequency to said fixed winding, servomechanism means controlled by the voltage received across the latter said rotating winding and by said one of said analogue voltages for causing each angular position of said variometer to correspond to one value of latter said amplitude, and a rotating coder, the shaft of which is linked with that of said variometer.

15. An electric control system as claimed in claim 9, wherein said resolver has a rotating winding fed from one of said proportional alternating voltages, and wherein two of said derived alternating voltages are respectively received across two mutually perpendicular of said fixed windings.

16. An electrical control system as claimed in claim 9, wherein said reference voltage is a multi-phase voltage and wherein said servomechanism means include a rotating phase variometer having a multi-phase fixed winding and a rotating single-phase winding, means for applying said multi-phase voltage to said multi-phase winding, means for applying voltage developed across said single-phase winding to a phase comparator together with a comparison voltage derived from one of said further voltages, a mechanical connection between said resolver and phase variometer, a mechanical connection between said resolver and a servomotor, and means for controlling said servomotor from the output current of said phase comparator.

17. An electrical control system as claimed in claim 11, wherein said further electromechanical control means include at least one disk of solid material secured to the shaft of one of said resolvers and rotating therewith, at least one transparent semi-circular track in said disk, at least one light source illuminating said disk, at least one photoelectric device receiving light transmitted through said disk, and means for receiving photoelectric currents from said photoelectric device or devices and for causing said photoelectric currents to control the current delivered by at least one of said direct current supplying devices.

18. An electric control system as claimed in claim 17, wherein two semi-circular transparent tracks angularly shifted with respect to each other by 90 degrees around the rotation axis of said disk are provided therein, and wherein light transmitted therethrough is received by at least two photoelectric devices.

19. An electric control system as claimed in claim 13, wherein said amplifiers are transistor amplifiers.

20. An electric control system as claimed in claim 14, wherein said rotating coder includes at least one rotating disk of solid material, a plurality of circular tracks in latter said rotating disk each comprising alternate transparent and opaque parts distributed along each one of said circular tracks, at least one light source illuminating said circular tracks, photoelectric devices in number at least equal to that of said circular tracks and receiving light transmitted therethrough, and means for receiving photoelectric currents from said photoelectric devices and for causing latter said photoelectric currents to generate said digital data.

21. An electric control system as claimed in claim 20, wherein the mechanical link between said shaft of said induction variometer and the shaft of said coder consists of gear ensuring a predetermined non-linear relationship between the respective angular motions of said induction variometer and coder.

22. An electric control system as claimed in claim 20, wherein at least part of said circular tracks includes alternate transparent and opaque parts distributed at non-uniform angular intervals along latter said track or tracks.

References Cited by the Examiner

UNITED STATES PATENTS

| | | | |
|---|---|---|---|
| 2,779,217 | 1/1957 | Stovall et al. | 73—462 X |
| 2,783,648 | 3/1957 | Stovall et al. | 73—462 |
| 3,063,635 | 11/1962 | Gordon | 235—151 |
| 3,098,995 | 7/1963 | Mundt | 235—151 X |
| 3,135,055 | 6/1964 | Butler et al. | 235—151 X |
| 3,172,026 | 3/1965 | Shuman | 235—151 X |

MALCOLM A. MORRISON, *Primary Examiner.*

I. KESCHNER, *Assistant Examiner.*